US009880571B2

(12) United States Patent
Tempel et al.

(10) Patent No.: US 9,880,571 B2
(45) Date of Patent: Jan. 30, 2018

(54) SANITARY INSTALLATION PART AND SANITARY FITTING WITH SUCH AN INSTALLATION PART

(71) Applicant: Neoperl GmbH, Mullheim (DE)

(72) Inventors: Marc Tempel, Freiburg (DE); Christoph Weis, Mullheim (DE)

(73) Assignee: Neoperl GmbH, Müllheim (DE)

( * ) Notice: Subject to any disclaimer, the term of this patent is extended or adjusted under 35 U.S.C. 154(b) by 32 days.

(21) Appl. No.: 14/763,312

(22) PCT Filed: Dec. 3, 2013

(86) PCT No.: PCT/EP2013/003642
§ 371 (c)(1),
(2) Date: Jul. 24, 2015

(87) PCT Pub. No.: WO2014/117795
PCT Pub. Date: Aug. 7, 2014

(65) Prior Publication Data
US 2015/0355648 A1    Dec. 10, 2015

(30) Foreign Application Priority Data

Jan. 29, 2013  (DE) .................... 20 2013 000 860 U

(51) Int. Cl.
| | |
|---|---|
| *F16K 31/68* | (2006.01) |
| *G05D 23/12* | (2006.01) |
| *G05D 23/02* | (2006.01) |
| *G05D 23/08* | (2006.01) |
| *E03C 1/04* | (2006.01) |

(Continued)

(52) U.S. Cl.
CPC ............... *G05D 23/08* (2013.01); *E03C 1/04* (2013.01); *E03C 1/041* (2013.01); *E03C 1/08* (2013.01); *F16K 3/08* (2013.01); *F16K 31/00* (2013.01); *F16K 31/002* (2013.01); *G05D 7/012* (2013.01);

(Continued)

(58) Field of Classification Search
CPC ...... G05D 23/08; G05D 23/022; G05D 7/012; E03C 1/04; E03C 1/041; E03C 1/08; E03C 2001/026; F16K 31/00; F16K 3/08; F16K 31/002
See application file for complete search history.

(56) References Cited

U.S. PATENT DOCUMENTS 2,534,378 A   12/1950  Schlaich
2,607,369 A   8/1952   Miller
(Continued)

FOREIGN PATENT DOCUMENTS

CN   1083943      3/1994
CN   101454738    6/2009
(Continued)

*Primary Examiner* — Larry Furdge
(74) *Attorney, Agent, or Firm* — Volpe and Koenig, P.C.

(57) ABSTRACT

In a sanitary installation part (1) which, along with a functional unit (7), forms a flow volume regulator, it is proposed that a regulating element (13), which can be adjusted along an adjustment path, be coupled to a temperature-sensitive drive unit (15) such that different regulating positions of the regulating element (13) are set in dependence on the temperature of the medium flowing through the installation part (1), wherein the different regulating positions realize in each case different volume-flow dependencies (11, 12, 45, 48) and/or flow resistances.

19 Claims, 16 Drawing Sheets

(51) Int. Cl.
*F16K 31/00* (2006.01)
*F16K 3/08* (2006.01)
*E03C 1/08* (2006.01)
*G05D 7/01* (2006.01)
*E03C 1/02* (2006.01)

(52) U.S. Cl.
CPC ...... *G05D 23/022* (2013.01); *E03C 2001/026* (2013.01)

(56) References Cited

U.S. PATENT DOCUMENTS

| | | |
|---|---|---|
| 3,368,758 A | 2/1968 | Fraser |
| 3,500,899 A | 3/1970 | Shane, Jr. |
| 3,856,206 A | 12/1974 | Bell et al. |
| 5,642,859 A | 7/1997 | Ackroyd |
| 2006/0157575 A1* | 7/2006 | Lockhart ............... F16K 31/002 236/93 A |
| 2007/0075152 A1* | 4/2007 | Guterman ............... E03C 1/041 236/93 R |
| 2007/0290058 A1 | 12/2007 | Guterman |
| 2012/0180875 A1 | 7/2012 | Keller et al. |

FOREIGN PATENT DOCUMENTS

| | | |
|---|---|---|
| DE | 19745972 | 4/1999 |
| DE | 10132001 | 1/2003 |
| DE | 202004008281 | 10/2005 |
| DE | 102008034185 | 1/2010 |
| FR | 1137522 | 5/1957 |
| GB | 2301169 | 11/1996 |
| RU | 2081257 | 6/1997 |
| WO | 2007118702 | 10/2007 |
| WO | 2011006272 | 1/2011 |

* cited by examiner

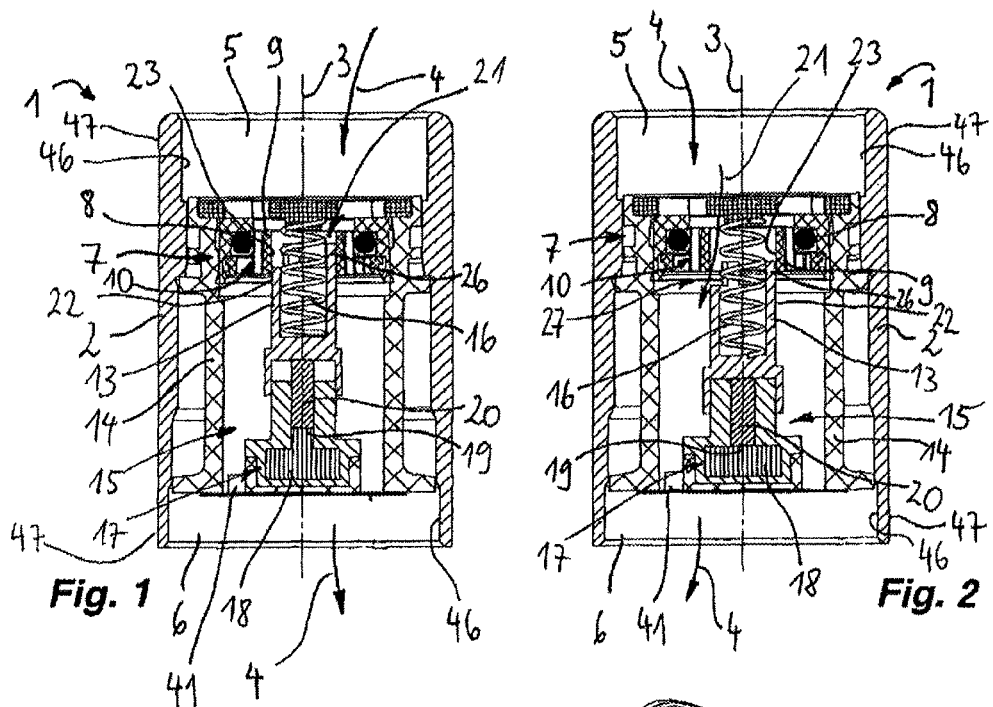
*Fig. 1*   *Fig. 2*
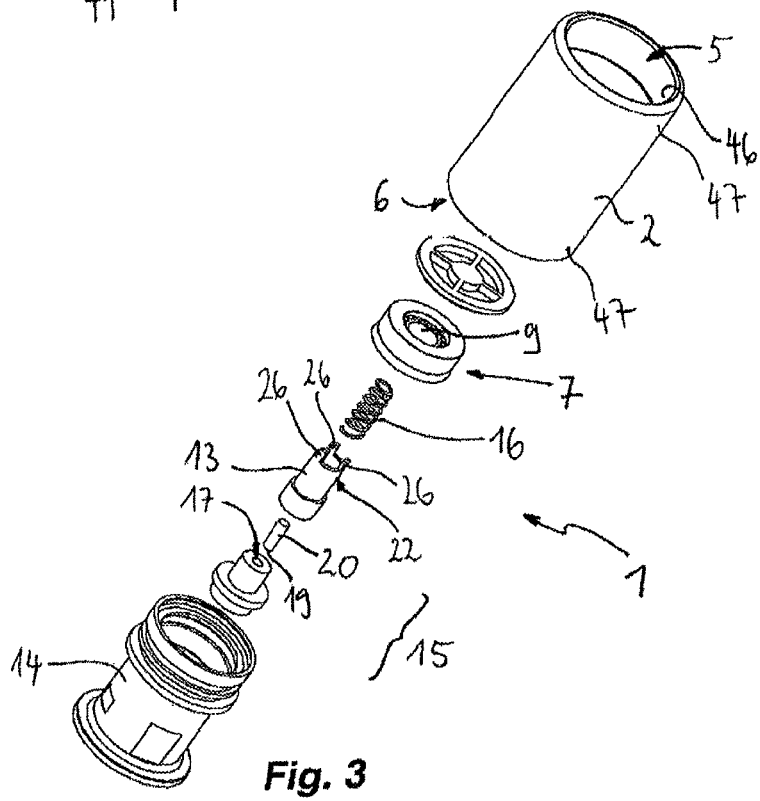
*Fig. 3*

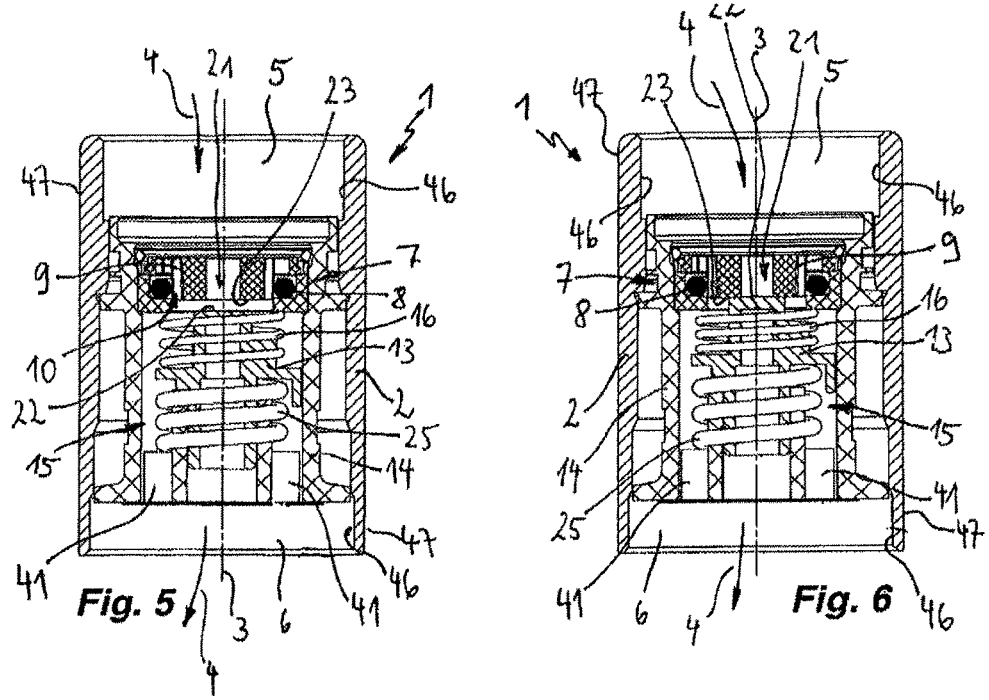
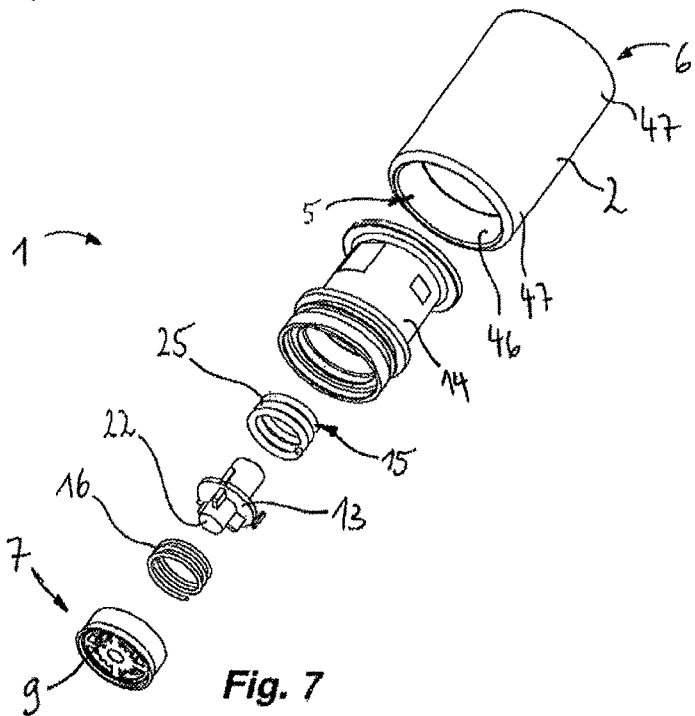

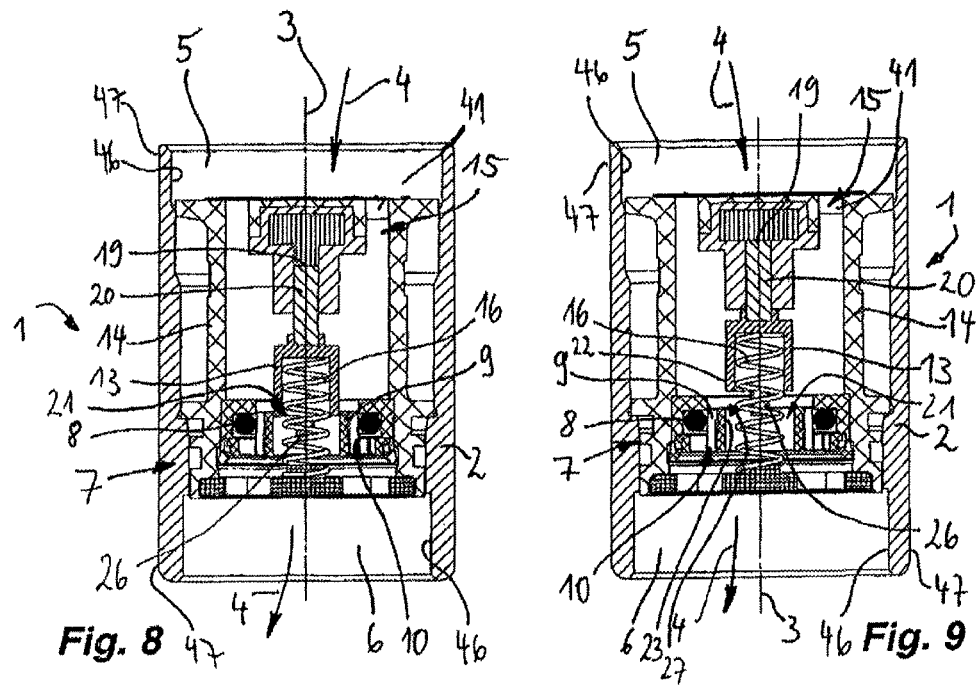
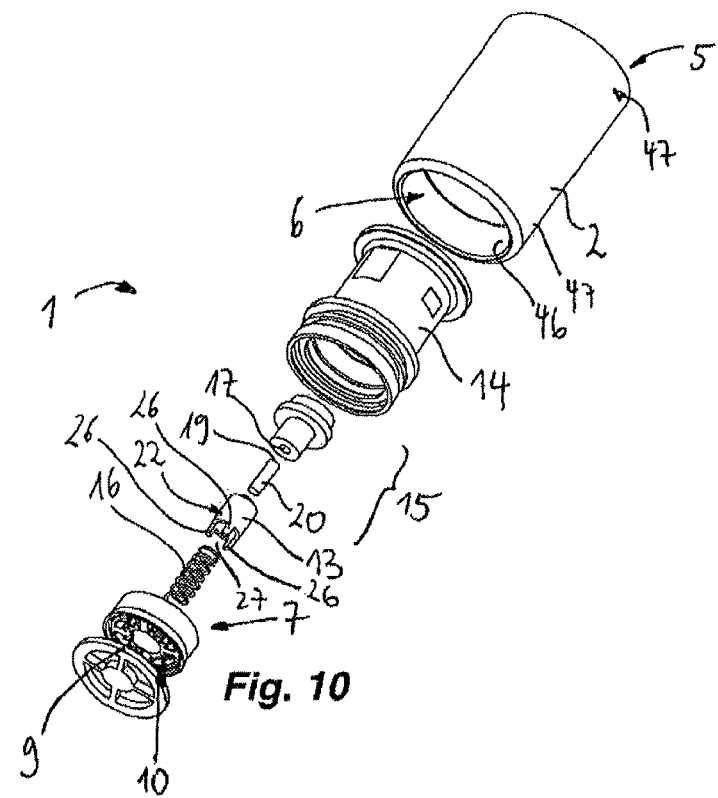

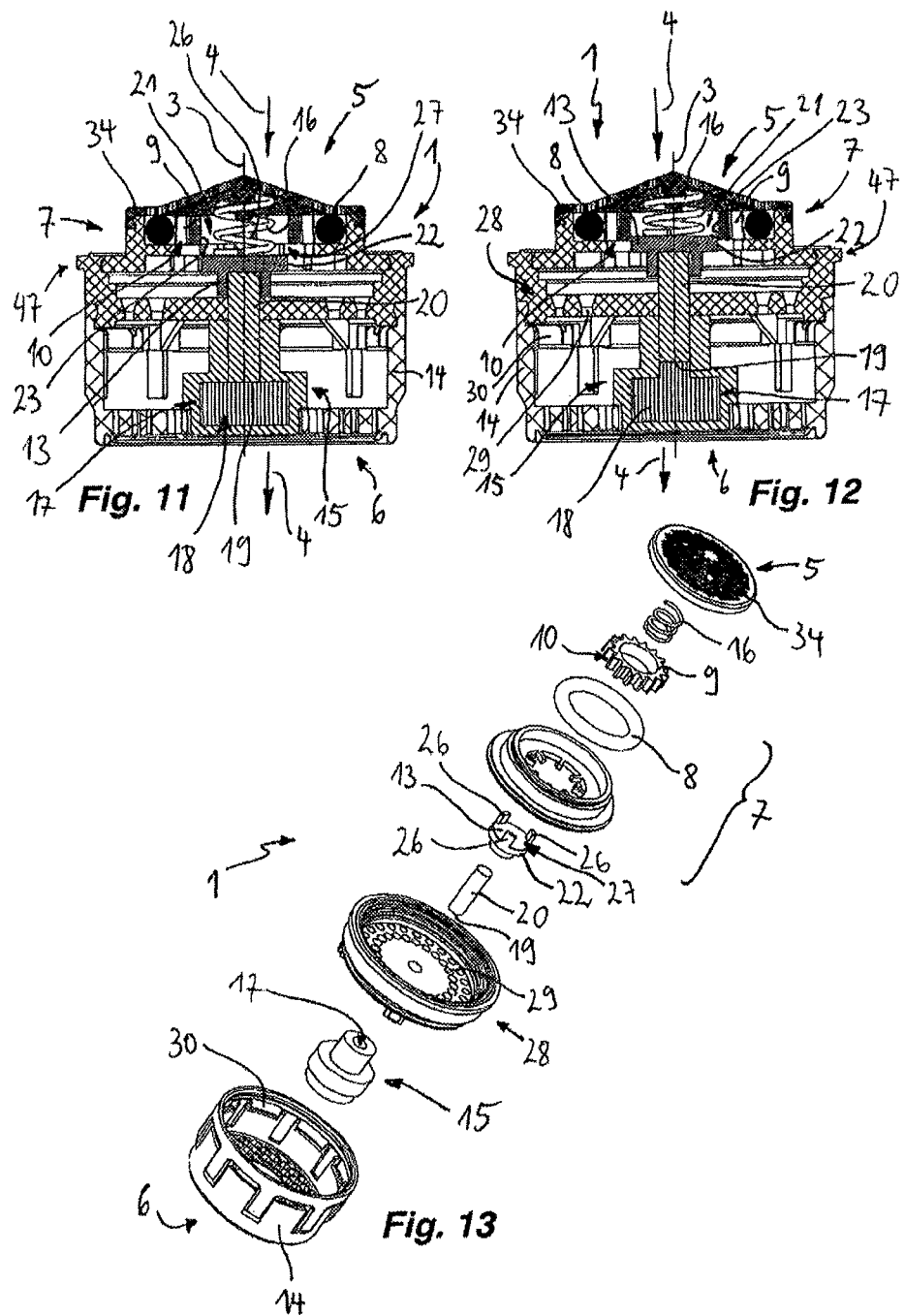

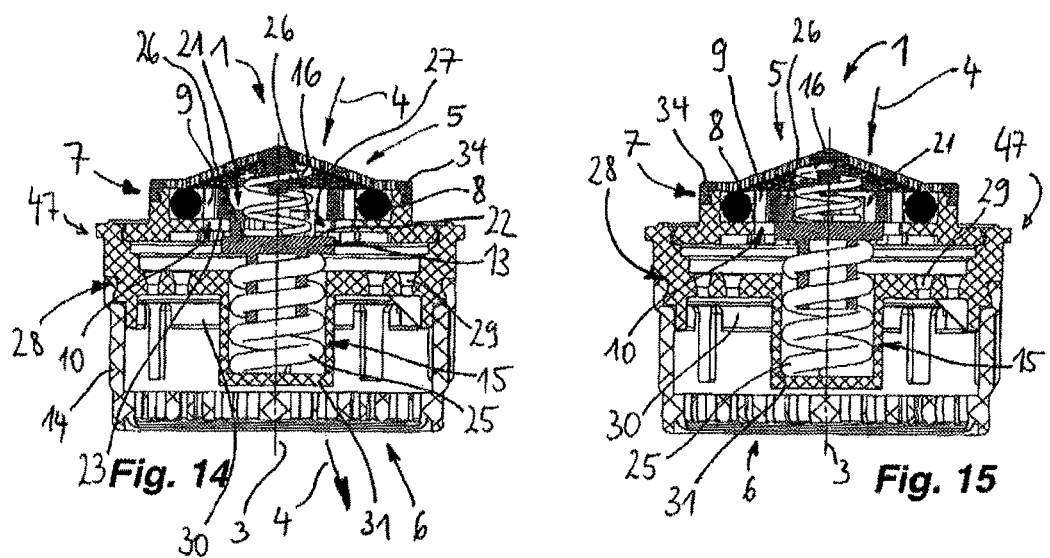
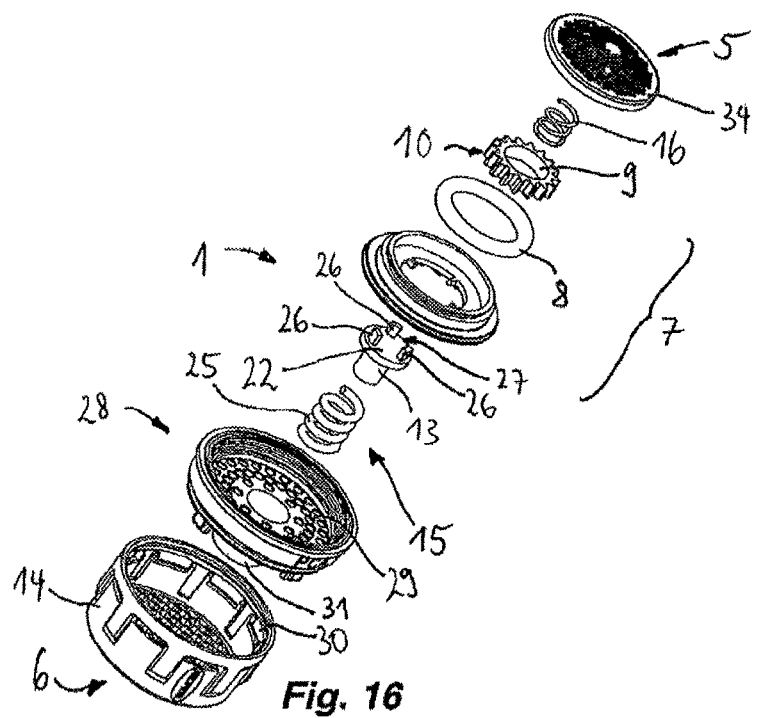

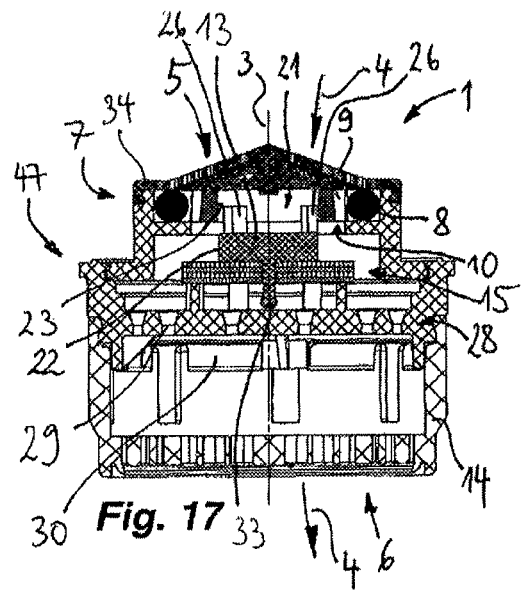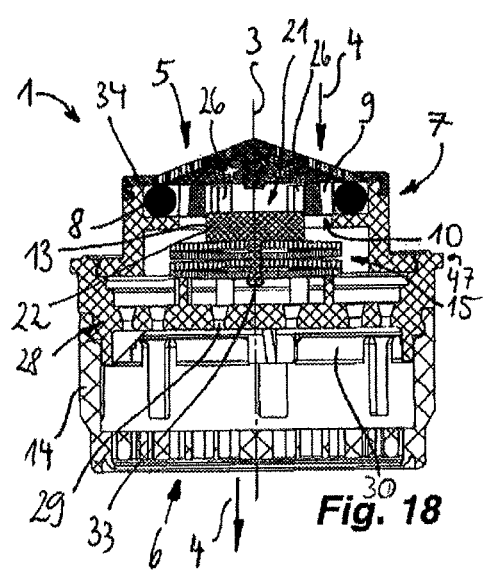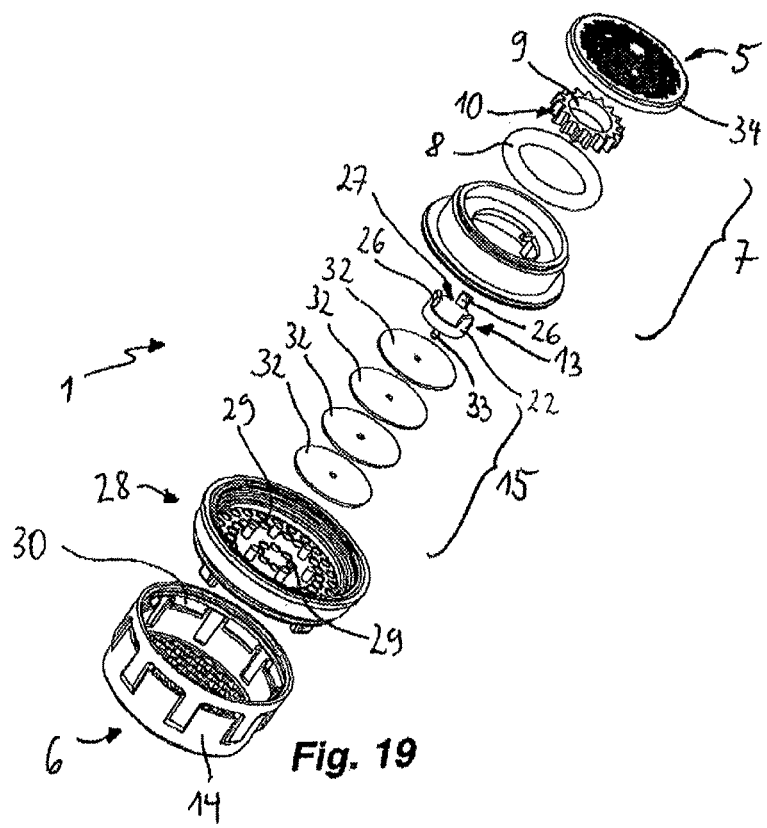

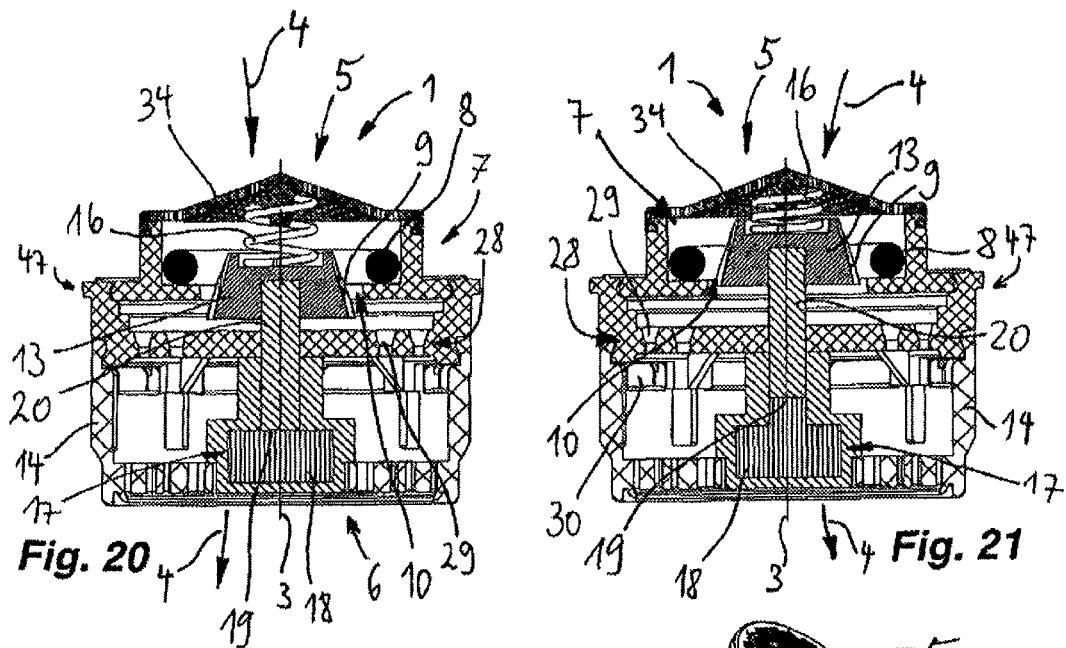
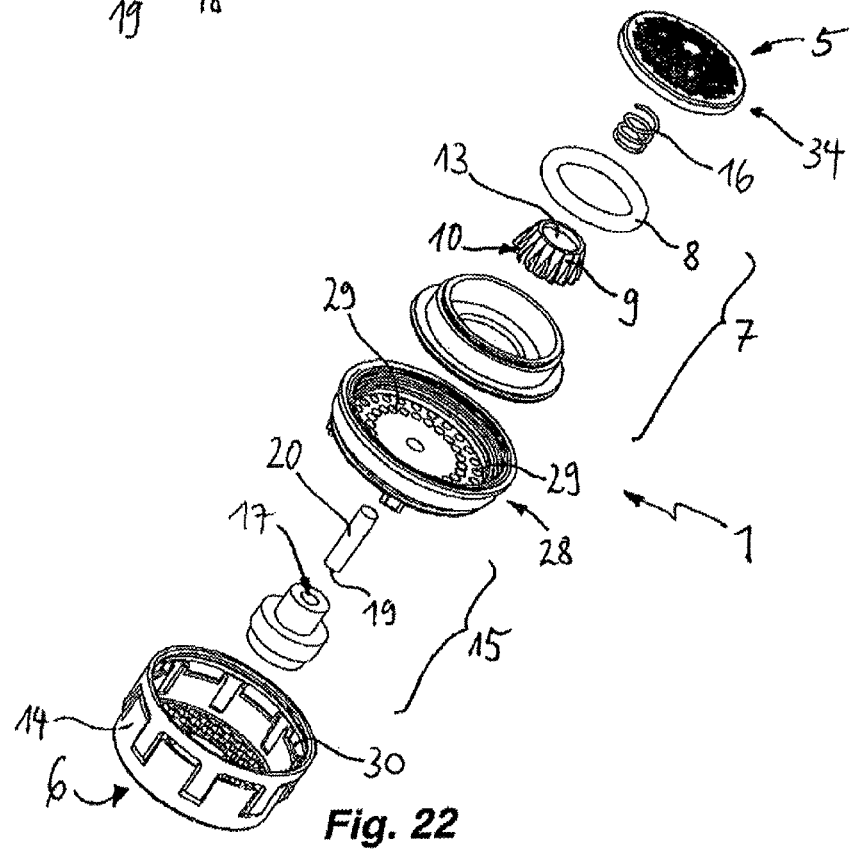

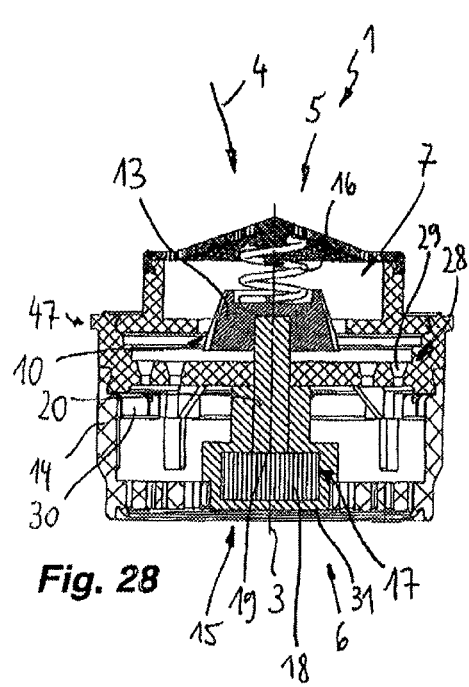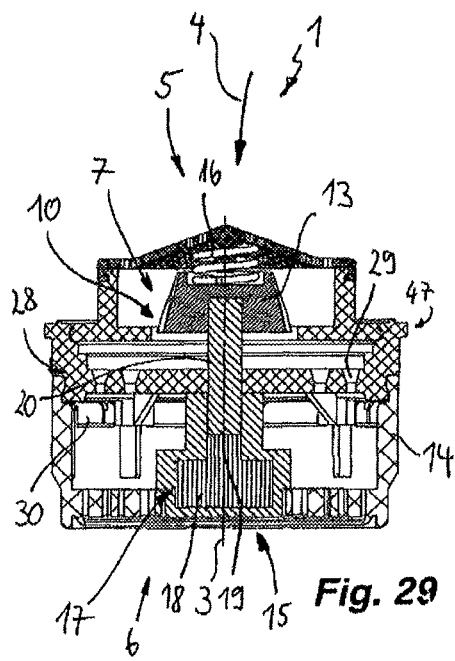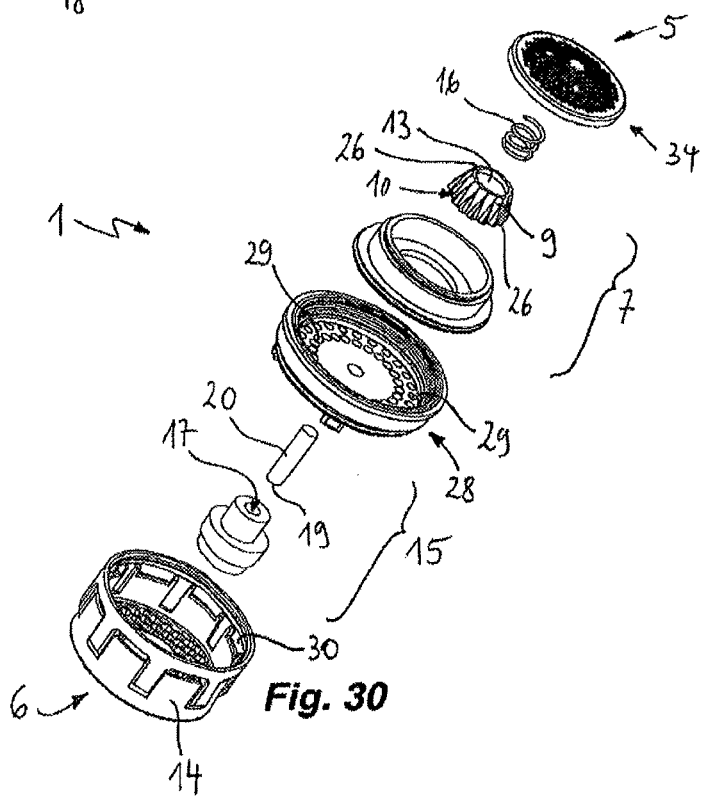

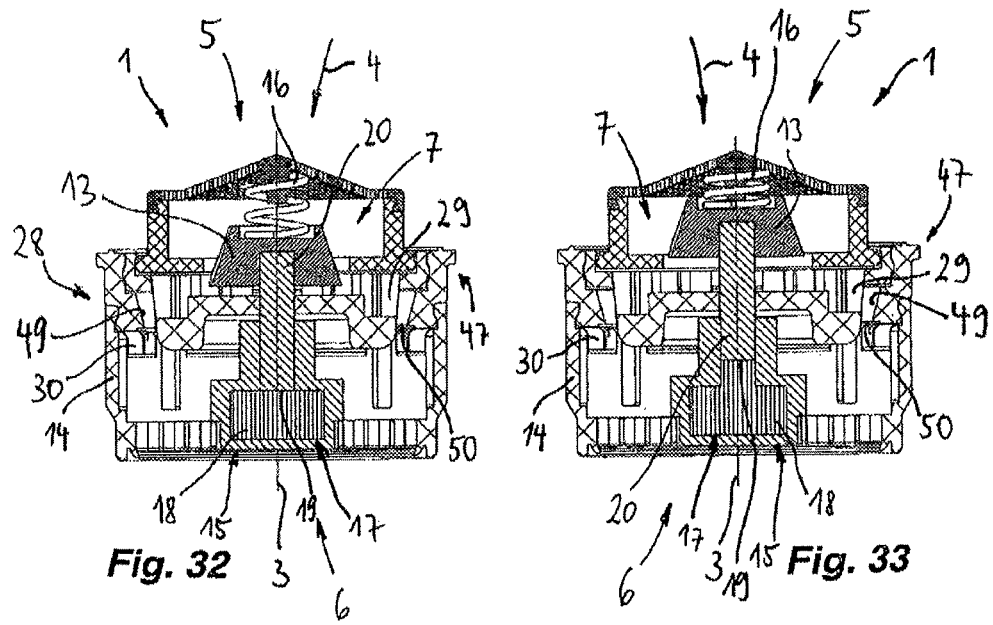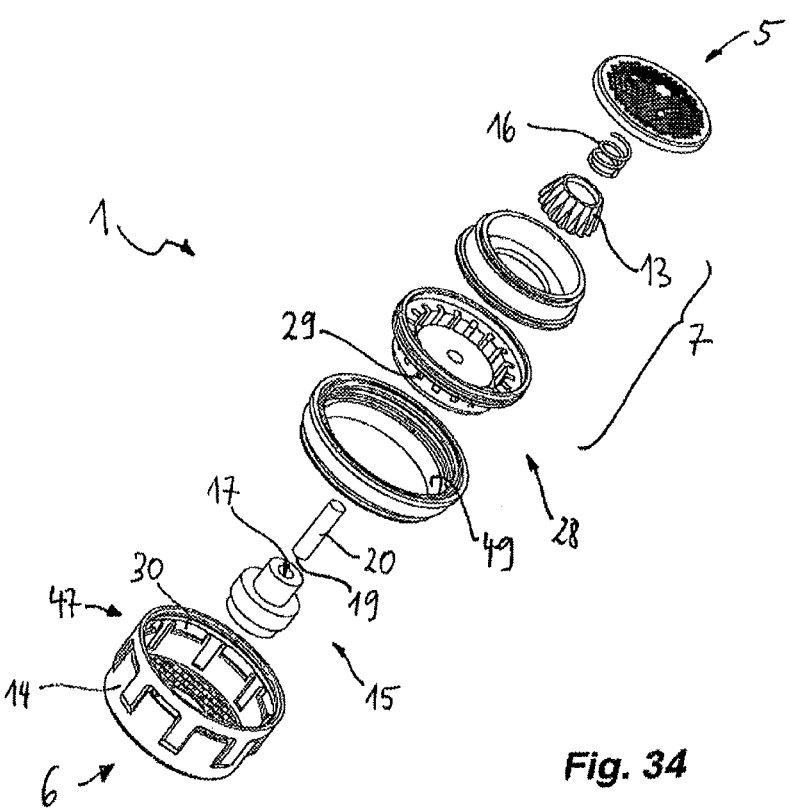

SANITARY INSTALLATION PART AND SANITARY FITTING WITH SUCH AN INSTALLATION PART

BACKGROUND

The invention relates to a sanitary installation part, having a functional unit which is arranged in a flow path of the installation part and defines a volume flow in dependence on a pressure as a volume flow dependency.

The invention is also concerned with a sanitary fitting which has a water inlet and a water outlet.

The invention finally also relates to a method for controlling a flow volume of flowing water by means of a sanitary installation part.

These types of installation parts are known as flow volume regulators in sanitation technology and are used for the purpose of saving water.

The known flow volume regulators cause the dwell time of the water or another liquid medium in the water pipe to be increased. This can result, particularly in the case of hot water pipes which are not kept permanently at temperature and cool down between usage cycles, in particular in the bacterial load of the transported water or another medium being increased. In addition, in the case of hot water pipes which have cooled, it lengthens the time taken between the opening of the fitting and the flowing of the hot water—depending on the length of time the pipe has been cold, which results in annoying the user and in unused water consumption.

A shower head which comprises a sanitary installation part for regulating the water flowing through the shower head in a temperature-sensitive manner in order to prevent a person standing under the shower head from being scalded by overly hot incoming water, is known previously from U.S. Pat. No. 3,368,758 A. For this purpose, the installation part provided in the previously known shower head has a functional unit which is realized as a valve with an adjusting element, which adjusting element is acted upon by a temperature-sensitive drive unit in such a manner that the position of the adjusting element along an adjustment path is changeable as a result of a change in temperature at the drive unit and the adjusting element is movable between an open and a closed position of the valve in dependence on the temperature of the water flowing past.

SUMMARY

The object underlying the invention is to create a sanitary installation part with improved usage properties.

To achieve said object, one or more features according to the invention are proposed in the case of a sanitary installation part of the type described in the introduction. Consequently, in particular in the case of an installation part of the type described in the introduction, it is provided that the functional unit comprises a movably arranged adjusting element which is longitudinally displaceable along an adjustment path at least between a first adjusting position and a second adjustment position, that the defined volume flow dependency is modifiable by a change in a position of the adjustment element along the adjustment path and that a temperature-sensitive drive unit acts upon the adjusting element in such a manner that the adjusting element is longitudinally displaceable along the adjustment path as a result of a change in temperature at the drive unit. In this case, a change in a position of the adjusting element along the adjustment path not only refers to a translatory movement, —said change in a position can also be carried out in fact as a rotational movement. The installation part according to the invention consequently allows for different treatment of hot water and cold water. Consequently, the installation part according to the invention makes it possible for water that has cooled in a water pipe after a longer period of non-use of the installation part to be able to flow out of the water pipe quicker than the hot water following it which as far as possible should only be used to a limited extent.

The change according to the invention in the volume flow dependency that is defined in each case can be described, for example, by a mathematical parameter of the volume flow dependency which can be changed and is changed as a result of a change in the position of the adjusting element. The parameter can describe, for example, an additive part, an increase (flow resistance), a functionality of the volume flow dependency (e.g. an exponent) and/or a restrictive value of the volume flow dependency. The volume flow dependency, in this connection, describes the dependency of the flow volume on a pressure (in a preferred manner with reference to a unit of time).

The installation part according to the invention can be realized, for example, for insertion or screw connection into an outlet mouth piece or as an intermediate piece in a pipe.

In the case of a development of the invention, it can be provided that the temperature-sensitive drive unit comprises a temperature-dependent expansion in at least one dimension or direction in space. It is advantageous in this case that the temperature of the medium, in particular of the water which flows through the flow path, is convertible simply into a corresponding adjustment position of the adjusting element. In a preferred manner, the temperature-dependent expansion comprises a coefficient of expansion which is greater than the coefficient of expansion of a receiving housing. It is advantageous in this case that an adjustment movement for changing the position relative to the housing is producible as result of a change in the temperature in the flowing medium.

In the case of a development of the invention, it can be provided that there is present a resetting spring which resets the adjusting element when the drive unit cools down to or below a first temperature, in particular into the first adjustment position. Consequently it is achievable that the first adjustment position is assumed as the initial position as soon as sufficient cooling of the flowing medium and consequently of the drive unit has taken place.

In the case of a development of the invention, it can be provided that the temperature-sensitive drive unit comprises a receiving chamber which is filled with a temperature-sensitive medium, wherein at least one movable chamber wall is operatively connected to the adjusting element and acts upon the adjusting element. In a preferred manner the movable chamber wall is realized on a piston which is operatively connected to the adjusting element. The advantage in this case is that effective conversion of changes in the temperature of the flowing medium into an adjustment movement of the adjusting element is achievable. In a preferred manner, the temperature-sensitive medium comprises a coefficient of expansion which is greater than the coefficient of expansion of a chamber wall of the receiving chamber. Consequently, a relative movement of the piston or the moved chamber wall relative to the remaining receiving chamber is enforceable as a result of changes in temperature. The return movement of the cooling is supportable with an already mentioned resetting spring.

In the case of a development of the invention, it can be provided that the drive unit comprises a drive element produced from a material with shape memory, such as, for example, memory shape metals. A drive element produced from a material with shape memory lends itself in particular when the change in position of the adjusting element along the adjustment path is to be performed as a rotational movement. It is advantageous in this case that a drive force that is applied to the adjusting element is limitable even if the flowing medium is heated in an unexpectedly high manner. Consequently, mechanical loading of a receiving housing as a result of excessive stresses is avoidable because the drive elements produced from memory shape metals are, as a rule, provided with their own elasticity. It is particularly expedient in this connection when the drive element is realized in a spring-shaped form, for example as a helical, leaf or spiral spring or as a spring in another form.

In the case of a development of the invention, it can be provided that the drive unit comprises at least one bimetal element, in particular a bimetal disk. It is advantageous in this case that a simple means is provided for generating the adjustment movement of the change in position which may cause a translatory or even a rotational movement of the adjusting element. To increase the adjustment path that is achievable overall, it can be provided that the drive unit comprises several bimetal disks arranged one behind another. It is particularly expedient in this case when the bimetal disks are arranged with reference to their expansion or operating direction one behind another in a row.

It can be provided that the parameter describes a material property of the functional unit, for example a spring constant and/or elasticity constant or a geometric property, for example a clearance of an opening.

In the case of a development of the invention, it can be provided that with the adjusting element in the first adjustment position a flow opening in the flow path is exposed or open and/or that with the adjusting element in the second adjustment position the or a flow opening in the flow path is closed or closable. It is advantageous, in this case, that the defined volume flow dependency is able to be influenced by the flow opening being exposable or openable. The flow opening can form a bypass. As a result of exposing the flow opening, in the volume flow dependency, an additional part in the flow volume can be added to the quantity regulating function. The flow opening can form a bypass to the functional unit, for example in order to define an additive part, which can be shut off, of the volume flow dependency set in each case or to deactivate part of the volume flow dependency or to develop it so as to be deactivatable.

In the case of a development of the invention, it can be provided that the adjustment path is set up in an impact-free manner at least at a path end that is closer to the second adjustment position. It is advantageous, in this case, that a development of excessive forces once the second adjustment position has been reached, as would occur, for example, in the case of further uncontrolled, thermal expansion against a stop, is avoidable. Consequently, mechanical loading of a housing which receives the drive unit as a result of thermal stresses is reducible. Consequently, the life expectancy of the sanitary installation part is further increasable.

In the case of a development of the invention, it can be provided that the adjustment path extends between the first adjustment position and an adjustment end position, wherein the second adjustment position is arranged between the first adjustment position and the adjustment end position. It is advantageous, in this case, that when the adjusting element moves out of the first adjustment position into the second adjustment position, more play is realized behind the second adjustment position which allows a movement beyond the second adjustment position. Consequently, a simple means is provided to realize an impact-free adjustment path.

The realization of an impact-free adjustment path is particularly advantageous when the drive unit operates with thermal expansion of a temperature-sensitive medium which does not comprise any of its own elasticity or only very little. This is because it has been shown that the realization of a stop for limiting the adjustment path where the drive element lacks its own elasticity is a problem: there is the risk that the drive element damages or demolishes the boundary of the adjustment path.

In the case of one development of the invention, it can be provided that the adjusting element comprises a contact surface which interacts with a counter contact surface for closing the or a flow opening. It is advantageous in this case that the flow opening is closable or exposable in a simple manner, in dependence on the adjustment position of the adjusting element. It is especially expedient when the contact surface interacts in a sealing manner with the counter contact surface.

In the case of a development of the invention, it can be provided that the or a contact surface of the adjusting element is movable past the or a counter contact surface of a housing part as a result of a change in position of the adjusting element along the adjustment path. Consequently, the adjusting element is movable along the adjustment path on both sides of an adjustment position, for example on both sides of the second adjustment position, in which the contact surface assumes the smallest spacing to the counter contact surface. In a preferred manner, the adjustment position in which the contact surface has the smallest spacing to the counter contact surface is provided by the second adjustment position. It is advantageous in this case that the adjustment path is realizable in an impact-free manner at least in the immediate vicinity of the second adjustment position.

In the case of a development of the invention, it can be provided that the or a contact surface is aligned longitudinally or tangentially with respect to the adjustment path on the adjusting element. It is advantageous in this case that a movement of the contact surface past a correspondingly realized counter contact surface, for example with parallel development, is made possible in a simple manner as a result of a change in a position of the adjusting element along the adjustment path.

In this connection, the contact surface can be aligned coaxially with respect to the counter contact surface when both surfaces are realized in a cylindrical manner. In a simple manner, said alignment allows the contact surface to move past the counter contact surface (or vice versa) in an impact-free manner, the contact surface, with the counter contact surface, being able to bring about an almost or entirely tight closure in the position of closest approximation.

It is particularly expedient when the contact surface is ring-shaped or cylindrical and when the counter contact surface is realized appropriately in a correspondingly ring-shaped or cylindrical manner.

In the case of a development of the invention, it can be provided that the adjusting element engages with a guide element in the or a flow opening at least in the first adjustment position. It is advantageous in this case that the adjusting element is guidable along the adjustment path in the first adjustment position with reference to the flow opening. It is particularly expedient when the adjusting element engages in the or a flow opening in all the adjustment positions along the adjustment path. It is advantageous in this case that a defined movement of the adjusting element along the adjustment path is configurable.

In the case of a development of the invention, it can be provided that the functional unit forms a flow resistance in the flow path which increases as the pressure rises. It is advantageous in this case that a quantity regulating and/or quantity limiting function is realizable in a simple manner. For example, this can be achieved as a result of a resistance body in the flow path, the position and/or size of which is changeable and the position and/or size of which is pressure-dependent. It is particularly expedient when the functional unit, with the adjusting element situated in the second adjustment position, forms a flow resistance in the flow path which increases as the pressure rises. The increase in the flow resistance consequently counters the increase in the flow volume per unit time as the pressure rises, which takes place otherwise, such that overall the desired quantity regulating function is produced. The flow resistance, in this connection, can be proportional to the pressure loss over the functional unit.

In the case of a development of the invention, it can be provided that the functional unit defines a traversed opening cross section, the cross sectional area of which reduces as the pressure gradient increases automatically over the functional unit. It is advantageous in this case that a flow resistance which increases as the pressure rises is formable and providable in the flow path in a simple manner.

A particularly simple development can provide that the mentioned resistance body is realized as an O-ring seal.

In general, it is expedient when the drive unit is in thermal contact with the medium flowing in the flow path, for example water. It is advantageous in this case that the change in temperature in the flowing medium is directly convertible in a simple manner into an adjustment movement of the adjusting element.

In the case of a development of the invention, it can be provided that the drive unit is arranged in the flow path so as to be flowed around. It is advantageous in this case that the thermal connection between the drive unit and the flowing medium is particularly effective.

In the case of a development of the invention, it can be provided that the drive unit is arranged downstream of the functional unit in a flow direction of the flow path. It is advantageous in this case that good use can be made of the space in a sanitary installation part. As an alternative to this, the drive element can also be arranged upstream of the functional unit.

In the case of a development of the invention, it can be provided that that the volume flow dependency describes a throttle function below a threshold temperature. Consequently, running off of cold water can be configurable practically in a non-limited manner. A throttle function in this connection is to be understood as a function which defines a volume flow dependency, as is present in the case of a throttle. For example, this can be characterized in that there is an extensively pressure-independent flow resistance at least above an initial pressure (more precisely the development of a root function is produced). A throttle can be characterized by an extensively proportional behavior between pressure drop and associated flow volume.

As an addition to this or as an alternative to it, it can be provided that the volume flow dependency describes a quantity restricting function above the or a threshold temperature. A quantity restricting function is to be understood in this connection as a function which is present in the case of a quantity regulator. For example, this can be characterized in that at least above an initial pressure there is a flow resistance (first outlet) which increases as the pressure rises. In the case of a quantity regulating function which describes a limiting of the flow volume below a restrictive value, the increase in the flow resistance in this case is so strong that the restrictive value is produced as a horizontal asymptote of the quantity regulating function.

These qualitative descriptions of the quantity regulating function are applicable as a rule up to a maximum admissible pressure, for example up to 10 bar or up to another maximum admissible pressure usual when designing sanitary installations, above which regular functioning of the functional unit is no longer provided.

In a preferred manner, the threshold temperature is fixed within a range which separates the temperature of the hot water from the temperature of the cold water, for example within the range of between 20° C. and 40° C., in particular within the range of between 25° C. and 35° C., in a particularly preferred manner within the range of between 28° C. and 32° C.

In general it is expedient when the sanitary installation part is realized as an insertion cartridge. Consequently, the sanitary installation part can be used with sanitary fittings in a versatile manner.

In the case of an advantageous development, it can be provided that the installation part is realized as a flow regulator. Consequently, in the case of a flow regulator a temperature-dependent switchover of the functional unit between two defined volume flow dependencies is configurable.

In the case of an advantageous development, it can be provided that the installation part is provided with a thread and is insertable into a receiving housing. The thread, in this connection, can be realized as an internal thread and/or as an external thread. The receiving housing can be realized, for example, on a sanitary fitting or on a sanitary hose.

In the case of the sanitary fitting of the type mentioned in the introduction, frequent use and achievement of the named object of the invention provide that an installation part is arranged in the water inflow and/or in the water outflow of the sanitary fitting.

It is advantageous in this case that a different flow behavior is achievable in a simple manner for cooled water situated in a hot water pipe and for the hot water situated at operating temperature in the hot water pipe. The invention consequently allows the desired saving effect for hot water to be combined with as short as possible an operating time until the hot water is actually ready at the water outlet.

To achieve the named object, it is provided according to the invention in the case of a method of the type mentioned in the introduction that a volume flow dependency, which defines a volume flow in dependence on a pressure, is adjusted in dependence on a temperature of the flowing medium, wherein the volume flow dependency defines a first flow volume in the case of at least one pressure of the flowing medium at a first temperature and a second flow volume which is smaller than the first flow volume at a second temperature which is higher than the first temperature. In a preferred manner, the flow quantities are with reference to a fixed unit of time. It is advantageous in this case that unwanted, cold water is quickly dischargeable, whereas a saving function which limits or regulates the flow volume per unit time is realizable for energetically more valuable hot water.

In the case of a development of the invention, it can be provided that the volume flow dependency defines an increased flow resistance of a flow path and/or a limiting of the flow volume at or above the second temperature. Consequently, the water consumption for hot water is reducible in a simple manner.

In the case of a development of the invention, it can be provided that the volume flow dependency defines a flow resistance of the or of a flow path that increases as the pressure rises at or above the second temperature. It is advantageous in this case that a quantity restriction or at least a reduction in the flow volume compared to a throttle is achievable.

In the case of a development of the invention, it can be provided that below a threshold temperature of the flowing medium, in particular at the first temperature, a volume flow dependency of a throttle function is set and/or that above the or a threshold temperature of the flowing medium, in particular at the second temperature, a volume flow dependency of a quantity limiting function is set. In the case of a volume flow dependency of a throttle function which is set with the flowing medium below a threshold temperature, cooled hot water, for example, can be run off quickly such that hot water at operating temperature is able to be quickly provided. If a volume flow dependency of a quantity limiting function with the flowing medium above a threshold temperature is set, a water saving function, for example, for hot water is realizable.

BRIEF DESCRIPTION OF THE DRAWINGS

The invention is now described in more detail by way of exemplary embodiments, but is not restricted to said exemplary embodiments. Further exemplary embodiments are produced as a result of a combination of the features of individual or several claims together and/or with individual or several features of the exemplary embodiments, in which:

FIG. 1 shows a sectional representation of a sanitary installation part according to the invention where the adjusting element is situated in the second adjustment position, FIG. 2 shows the installation part according to FIG. 1 with the adjusting element situated in the first adjustment position, FIG. 3 shows an exploded drawing of the installation part according to FIG. 1, FIG. 5 shows a further installation part according to the invention with a drive unit with material with shape memory, FIG. 6 shows the installation part according to FIG. 5 with the adjusting element situated in the second adjustment position, FIG. 7 shows an exploded drawing of the installation part according to FIG. 5, FIG. 8 shows a sectional representation of a further installation part according to the invention with a drive unit mounted upstream in the direction of flow, FIG. 9 shows the installation part according to FIG. 8 with the adjusting element situated in the first adjustment position, FIG. 10 shows an exploded drawing of the installation part according to FIG. 8, FIG. 11 shows a sectional representation of a further installation part according to the invention which is realized as a flow regulator, FIG. 12 shows the installation part according to FIG. 11 with the adjusting element situated in the second adjustment position, FIG. 13 shows an exploded drawing of the installation part according to FIG. 11, FIG. 14 shows a further installation part according to the invention which is realized as a flow regulator, having a drive unit with a material with shape memory, FIG. 15 shows the installation part according to FIG. 14 with the adjusting element situated in the second adjustment position, FIG. 16 shows an exploded drawing of the installation part according to FIG. 14, FIG. 17 shows a further installation part according to the invention which is realized as a flow regulator, having a drive unit with bimetal disks, FIG. 18 shows the installation part according to FIG. 17 with the adjusting element situated in the second adjustment position, FIG. 19 shows an exploded drawing of the installation part according to FIG. 17, FIG. 20 shows a sectional representation of a further installation part according to the invention which is realized as a flow regulator, having an adjusting element which is realized as a variably positionable active element, FIG. 21 shows the installation part according to FIG. 20 with the adjusting element moved into the active position, FIG. 22 shows an exploded drawing of the installation part according to FIG. 20, FIG. 28 shows a further installation part according to the invention which realizes two throttle functions, FIG. 29 shows the installation part according to FIG. 28 with the adjusting element situated in the second adjustment position, FIG. 30 shows an exploded drawing of the installation part according to FIG. 28, FIG. 32 shows a further installation part according to the invention which is realized as a flow regulator, FIG. 33 shows the installation part according to FIG. 32 with the adjusting element situated in the second adjustment position, FIG. 34 shows an exploded drawing of the installation part according to FIG. 32.

DETAILED DESCRIPTION OF THE PREFERRED EMBODIMENTS

Figure 4:
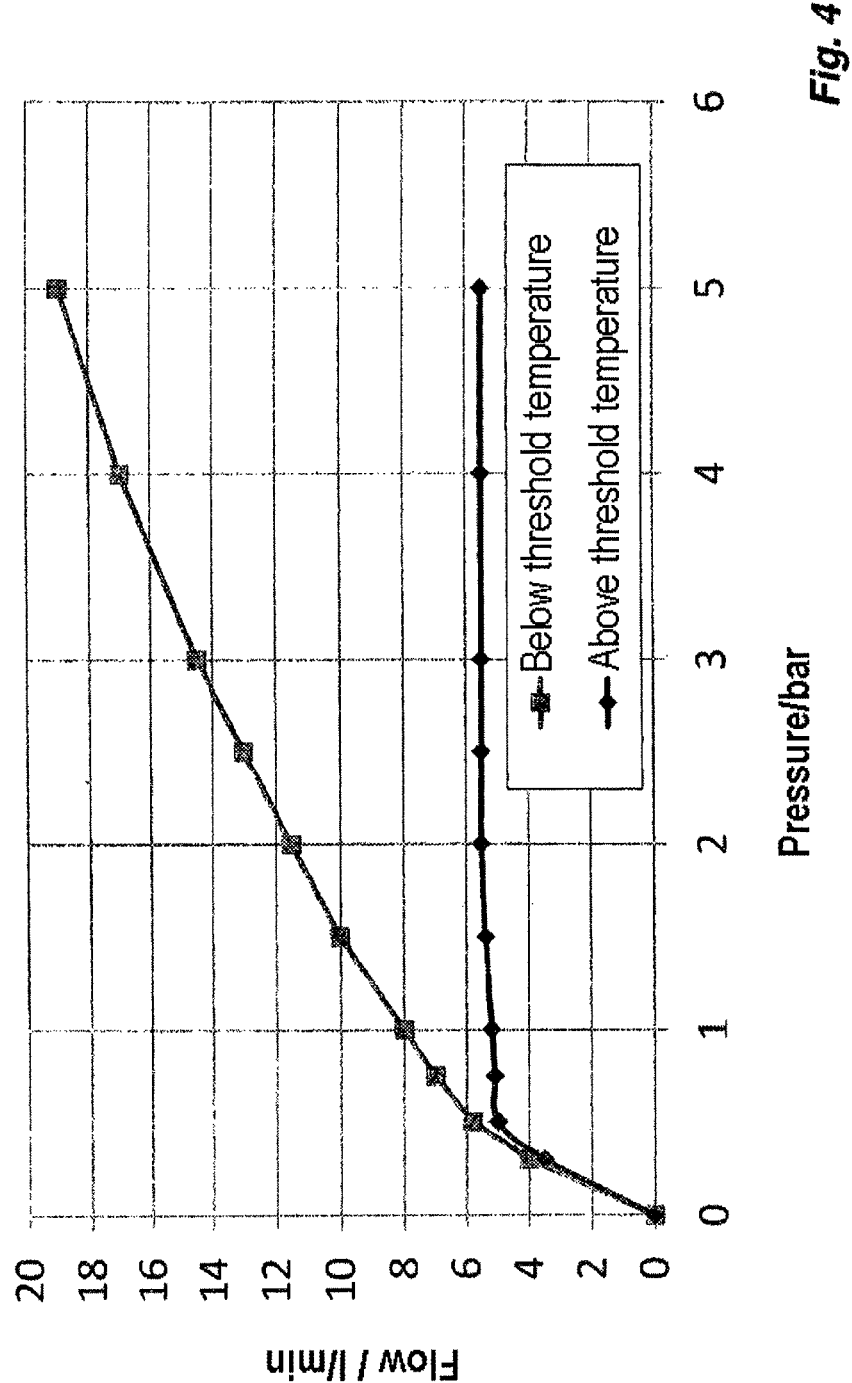
FIG. 4 shows two volume flow dependencies which are realizable with the installation part according to FIG. 1.

FIG. 1 shows an axial sectional representation of a sanitary installation part according to the invention which is designated overall by the reference 1.

The installation part 1 is realized with a tubular installation sleeve 2 as a cartridge, in particular an insertion cartridge.

An axis 3 of the installation sleeve 2, which is cylindrical in the example, defines a flow path 4, the direction of flow of which runs from top to bottom in FIG. 1 between an inlet 5 and an outlet 6.

A functional unit 7, which in a manner known per se provides a volume flow dependency of a quantity regulating function with a resistance body 8—an O-ring seal—, is realized in the flow path 4 between the inlet 5 and the outlet 6. In this connection, depending on the pressure pending at the inlet 5 or depending of the pressure falling between the inlet 5 and the outlet 6 over the functional unit 7, the resistance body 8 is pressed in a variously strong manner against a receiving part 9 in order to form an opening cross section 10 with a pressure-dependent cross-sectional area.

It is achieved in this manner that a high pressure at the inlet 5 or a large pressure difference between the inlet 5 and the outlet 6 results in a small cross-sectional area of the opening cross section 10 and, in reverse, a lower pressure results in a large cross-sectional area.

Consequently, the functional unit 7 counters the natural increase in the flow volume per unit time when the pressure rises as a result of the cross-sectional area of the opening cross section 10 automatically being reduced. In the case of other exemplary embodiments, a different elastic molded body is present instead of the O-ring seal in order to form a pressure-dependent cross-sectional area.

A volume flow dependency, which is shown with the main features or qualitatively in the image according to FIG. 4, is consequently produced. The numerical values provided there are simply added for illustration and can clearly deviate from the numerical values given in the case of other exemplary embodiments.

In the described manner, the installation part 1 according to FIG. 1 realizes a volume flow dependency 11 by the curve at a temperature which is below a (lower) temperature threshold (cf. FIG. 4). It is obvious that the flow rate (per unit time) is almost constant and restricted for pressures above 1 bar. The volume flow dependency 11 consequently describes a quantity limiting function where the flow resistance increases as the pressure rises at least above an initial pressure of approximately 1 bar. The asymptotic, horizontal straight line, which describes the limiting to values below a restrictive value of six liters per minute, defines a parameter of the realized volume flow dependency.

If said parameter is changed, for example a volume flow dependency 12 in FIG. 4 is produced. In the case of said volume flow dependency 12, the asymptotic development, that is the development for large pressures (here above an initial pressure of approximately 1 bar), is no longer provided by a horizontal straight line, but by a straight line which ascends in an approximately linear manner, more precisely as a root function. This ascending straight line describes an almost or precisely pressure-independent flow resistance, for example of a throttle. The volume flow dependency 12 consequently describes a throttle function in a qualitative manner. The quantity restriction of the volume flow dependency 11 is deactivated.

The functional unit 7 in FIG. 1 comprises an adjusting element 13 which is arranged so as to be movable or positionally variable relative to a housing 14 and/or to the resistance body 8.

The adjusting element 13 can consequently be adjusted or moved along a linear adjustment path, which is aligned parallel to the axis 3, between the first adjustment position of the adjusting element 13 shown in FIG. 2 and the second adjustment position of the adjusting element 13 shown in FIG. 1.

In the first adjustment position of the adjusting element 13 according to FIG. 2, the installation part 1 realizes the volume flow dependency 12 in FIG. 4.

In the second adjustment position according to FIG. 1 of the adjusting element 13, the installation part 1 realizes the volume flow dependency 11 in FIG. 4.

A drive unit 15 is realized in the installation part 1 for changing between the adjustment positions in FIG. 1 and FIG. 2.

The drive unit 15 is temperature sensitive and acts on the adjusting element 13 according to its own temperature.

The drive unit 15 in FIG. 1 is shown at a higher own temperature than in FIG. 2.

A resetting spring 16 is provided for returning the adjusting element 13 into the first adjustment position when cooling down from the situation according to FIG. 1 into the situation according to FIG. 2, that is below a threshold value. Water pressure which acts on active surfaces can support the returning of the adjusting element 13 in this connection.

The position according to FIG. 2 is assumed below a lower temperature threshold value $T_<$, the position according to FIG. 1 is assumed above an upper temperature threshold value $T_>$. The lower temperature threshold value $T_<$ and the upper temperature threshold value $T_>$ can be close together or even identical. The temperature threshold values $T_<$ and $T_>$ can separate the temperature range for cold water from the temperature range for hot water. The temperature threshold values $T_<$ and $T_>$ can be so close together that the transition from the volume flow dependency 12 to the volume flow dependency 11 when the traversing medium is heated is performed in a sudden manner (and in reverse when it is cooled).

Consequently, it is achieved overall that the adjusting element 13, with the drive unit 15 at a higher temperature, is in the second adjustment position according to FIG. 1, whereas the adjusting element 13, with the drive unit 15 at a lower temperature, is in the first adjustment position according to FIG. 2.

The adjustment movement necessary for a change in position is produced as a result of the drive unit 15 comprising a temperature-dependent expansion along the axis 3.

To this end, a receiving chamber 17, which is realized in the interior of the drive unit 15, is filled with a temperature-sensitive medium 18, for example thermo-wax.

The medium 18 has the characteristic that, at a temperature which is between the lower temperature threshold value $T_<$ and the upper temperature threshold value $T_>$ (or at the temperature threshold value if the lower temperature threshold value and the upper temperature threshold value coincide), it runs through a phase change and expands suddenly. Consequently, the temperature-sensitive medium 18 expands when the drive unit 15 is heated and acts on a movable chamber wall 19 of a piston 20. The piston 20 is consequently pushed out of the receiving chamber 17 when the medium 18 is heated.

The piston 20 is operatively connected to the adjusting element 13 and acts on said adjusting element such that the adjusting element 13, when the drive unit 15 is heated above a threshold value, is transferred from the first adjustment position according to FIG. 2 along a straight-lined adjustment movement into the second adjustment position according to FIG. 1. The change in the position of the adjusting element along the adjustment path is reached here by a translatory movement, —however, using a different suitable drive unit which can be produced from a shape memory material or from bimetal, it is also possible to bring about the change in position of the adjusting element along the adjustment path as a result of a rotational movement.

As already mentioned, once the drive unit 15 has cooled down, the resetting spring 16 once again returns the adjusting element 13 back into the first adjustment position according to FIG. 2.

A flow opening 21, which is open in FIG. 2 and which shows a bypass to the opening cross section 10, is realized in the functional unit 7.

This flow opening 21 is closed in FIG. 1 by the adjusting element 13 which is situated in the second adjustment position.

This opening 21 explains the different volume flow dependencies 11, 12 according to FIG. 4.

The increased flow volume of the volume flow dependency 12 is produced as a result of water flowing additionally through the open flow opening 21.

In contrast, in the first adjustment position the adjusting element 13 closes the flow opening 21 such that the water has exclusively to flow past the resistance body 8, as a result of which the volume flow dependency 11 is produced.

It can be seen from FIG. 1 that, in the case of further thermal expansion of the temperature-sensitive medium 18, the adjusting element 13 is movable beyond the second adjustment position shown in FIG. 1 into the closed flow opening 21.

The adjustment path of the adjusting element 13 is consequently set up in an impact-free manner at least at its path end which is closer to the second adjustment position (FIG. 1), and the adjusting element 13 is adjustable beyond the second adjustment position into an adjustment end position when the medium 18 expands further.

For sealing the flow opening 21 in the second adjustment position, the adjusting element 13 comprises a contact surface 22. The contact surface 22 is realized in a cylindrical manner and extends as an exterior cylinder about the axis 3.

This contact surface 22 interacts with a stationary counter contact surface 23. The counter contact surface 23 is realized as an internal cylinder, the diameter of the counter contact surface 23 being matched to the exterior diameter of the contact surface 22 in such a manner that a tight or an almost tight closure of the flow opening 21 is produced in the second adjustment position. In one exemplary embodiment, said tight closure can be produced by an additional O-ring seal (not shown). However, this increases the friction of the adjusting element and expenditure on production.

It can be seen from FIG. 1 that the contact surface 22, which brings about the sealing in the second adjustment position, can be moved past the counter contact surface 23, which interacts with said contact surface 22 to form the seal, when the position of the adjusting element 13 is changed into the adjustment end position.

It can also be seen in FIGS. 1 and 2 that the adjustment path of the adjusting element 13 is realized in a straight line. The adjustment path is aligned in the direction of flow.

In the case of other exemplary embodiments, crooked or curved adjustment paths are also configured, for example where the adjusting element 13 is pivoted or rotated. The adjustment path can also be aligned transversally, in particular perpendicularly, with respect to the direction of flow.

It can also be seen in FIGS. 1 and 2 that the contact surface 22 is aligned longitudinally or tangentially with respect to the adjustment path of the adjusting element 13 in order to make it possible for the contact surface 22 to move past the counter contact surface 23. The counter contact surface 23 is consequently also aligned longitudinally or tangentially with respect to the adjustment path.

In the case of the exemplary embodiment according to FIG. 1 and FIG. 2, this means that the axis 3, which describes the adjustment path of the adjusting element 13, at the same time provides the axis of the contact surface 22 forming an exterior cylinder and of the counter contact surface 23 forming an internal cylinder. The contact surface 22 and the counter contact surface 23 are consequently aligned coaxially with respect to one another, the adjustment path running along an axis with reference to which the coaxial alignment is defined.

The drive unit 15 is arranged in the flow path 4 so as to be flowed around by the flowing medium in order to enable as good as possible a thermal connection between the drive unit 15 and consequently the temperature-sensitive medium 18 and the flowing medium.

In the exemplary embodiment shown, the drive unit 15 is arranged downstream of the functional unit 7, that is on the downstream side, in the direction of flow of the flowing medium from the inlet 5 to the outlet 6.

The stationary part of the receiving chamber 17, in this connection, is secured on the housing 14.

Figure 25:
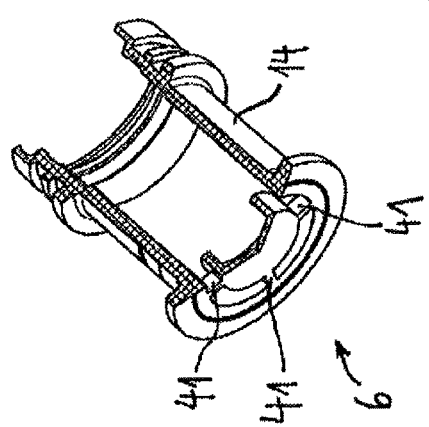
FIG. 25 shows a partially sectioned representation of the tubular housing from FIG. 1.

The drive unit 15, in this connection, rests on webs 41. The webs 41 are integrally molded on the inside of the housing 14 and form an abutment for the expansion force of the temperature-sensitive medium 18 (cf. FIG. 25).

The outlet filter 24 is also connected to the housing 14.

When the sanitary installation part 1 is in use, depending on the temperature of the flowing medium in the flow path 4, the adjusting element 13 is consequently moved or adjusted between the first adjustment position according to FIG. 2 and the second adjustment position according to FIG. 1 and, where applicable, beyond this into an end adjustment position. It is consequently achieved that with hot water as the flowing medium, the volume flow dependency 11 according to FIG. 4 is set and with cold water as the flowing medium, the volume flow dependency 12 according to FIG. 4 is set.

It can be seen from FIG. 4 that at at least one pressure, namely at least at pressures above 1 bar at which the quantity regulating function regulates in a reliable manner, at the first temperature below a temperature range, the volume flow dependency 12 defines a flow volume which is greater than the corresponding flow volume of the volume flow dependency 11 at the second temperature above the temperature range.

The volume flow dependency 11 consequently defines, at least at the upper temperature threshold value and in the exemplary embodiment also at higher temperatures, an increased flow resistance of the flow path 4, from which a limiting of the flow volume results. In the case of further exemplary embodiments, quantity regulating functions are realized at different temperatures.

Three guide elements 26, which engage in the flow opening 21 in all the adjustment positions of the adjusting element 13 for guiding the adjustment movement of the adjusting element 13, are realized in FIG. 3. In the case of further exemplary embodiments, other numbers and/or forms of guide elements are realized.

Openings 27 are realized between the guide elements 26 in order to enable the flowing medium to flow through the flow opening 21 in the first adjustment position of the adjusting element 13 according to FIG. 2.

FIGS. 5 to 7 show a further exemplary embodiment of a sanitary installation part 1 according to the invention. In this connection, components which are identical or similar in a functional and/or structural manner to the exemplary embodiment according to FIGS. 1 to 4 are designated with the same references and are not described again separately. The statements concerning FIGS. 1 to 4 consequently apply in a corresponding manner to FIGS. 5 to 7.

In contrast to the exemplary embodiment according to FIGS. 1 to 4, the drive unit 15 in the case of the exemplary embodiment according to FIGS. 5 to 7 comprises a drive element 25 which is wound in a spiral manner and is produced from a material with shape memory.

The drive element 25, in this connection, is realized such that on contact with cold water in the flow path 4, it contracts the expansion along the axis 3 according to FIG. 5, whereas on contact with hot water above a threshold temperature, it increases its expansion in the dimension along the axis 3 according to the representation in FIG. 6.

FIG. 5 consequently shows the first adjustment position in which the flow opening 21 is open as a bypass of the functional unit 7, whereas FIG. 6 shows the second adjustment position of the adjusting element 13 in which the flow opening 21 is closed.

In the adjustment position according to FIG. 5, the functional unit 7 consequently defines a volume flow dependency 12 according to FIG. 4, whereas the functional unit 7 in FIG. 6 defines a volume flow dependency 11 according to FIG. 4. The contribution of the flow opening 21 which acts as a throttle in the volume flow dependency 12 can clearly be seen.

The resetting spring 16 supports the return movement of the drive unit 15 when the flowing medium cools down in order to return the adjusting element 13 into the first adjustment position.

The force that can be applied by the drive element 25 overall is less than in the case of the temperature-sensitive medium 18 in FIGS. 1 to 3 on account of the inherent elasticity of the shape memory material and the development of the drive element 25 as a spring.

Consequently, it is possible in the case of the exemplary embodiment according to FIGS. 5 to 7 to realize the contact surface 22 not as an exterior cylinder but as or on the end face of the adjusting element 13.

The corresponding counter contact surface 23 is consequently realized as an axially aligned ring and forms a stop for the adjusting element 13 in the second adjustment position.

In the case of a corresponding realization of the contact surface 22 and the counter contact surface 23 in FIGS. 1 to 3, there would be the risk, in contrast, of the temperature-sensitive medium 18 which expands in an uncontrolled manner destroying the sanitary installation part 1.

FIGS. 8 to 10 show a further exemplary embodiment according to the invention of a sanitary installation part 1. In the case of the installation part 1, once again components and functional units which are identical or similar in a functional and/or structural manner to the exemplary embodiments according to FIGS. 1 to 7 are designated with the same references and are not described again separately. The statements concerning FIGS. 1 to 7 consequently apply in a corresponding manner to FIGS. 8 to 10.

In contrast to FIGS. 1 to 7, in the case of the exemplary embodiment according to FIGS. 8 to 10, the drive unit 15 is not arranged on the downstream side, but on the upstream side in the direction of flow upstream of the functional unit 7. The drive unit 15 is consequently fastened on webs 41. FIG. 9 consequently shows the adjusting element 13 in the first adjustment position and FIG. 8 in the second adjustment position.

FIGS. 11 to 13 show a further exemplary embodiment of a sanitary installation part 1 according to the invention where, once again components and functional units which are identical or similar in a functional and/or structural manner to the exemplary embodiments according to FIGS. 1 to 10 are designated with the same references and are not described again separately.

The exemplary embodiment according to FIGS. 11 to 13 comprises additionally a flow fractionating unit 28 which is arranged downstream of the functional unit 7 in the direction of flow.

The flow fractionating unit 28 has a plurality of nozzles 29 and air inlets 30 for mixing air with the flowing medium.

The sanitary installation part 1 is consequently realized as a flow regulator with a quantity regulating function.

Apart from this, the drive unit 15 is realized in an analogous manner to the exemplary embodiment in FIGS. 1 to 4.

In the exemplary embodiment according to FIGS. 14 to 16, once again components and functional units which are identical or similar in a functional and/or structural manner to the afore-described exemplary embodiments are designated with the same references and are not described again separately. The statements concerning the exemplary embodiments according to FIGS. 1 to 13 consequently apply here in a corresponding manner.

The sanitary installation part 1 is also realized in the exemplary embodiment according to FIGS. 14 to 16 as a flow regulator with a quantity regulating function and comprises a flow fractionating unit 28 which has already been described.

The operating principle of the drive unit 15, in this connection, is analogous to the exemplary embodiment according to FIGS. 5 to 7.

In this connection, a frame 31 which receives the drive element 25 can be realized so as to be permeable to the flowing medium. Consequently, the drive element 25 can be directly flowed around. If, in contrast, the frame 31 is realized in a non-permeable manner, the drive element 25 is flowed around indirectly in the drive unit 15.

FIGS. 17 to 19 show a further exemplary embodiment according to the invention of a sanitary installation part 1. Components and functional units which are identical or similar in a functional and/or structural manner to the exemplary embodiments according to FIGS. 1 to 16 are once again designated with the same references and are not described again separately. The statements concerning FIGS. 1 to 16 consequently apply in a corresponding manner to FIGS. 17 to 19.

In the case of the exemplary embodiment according to FIGS. 17 to 19, the drive unit 15 comprises four bimetal disks 32. These bimetal disks 32 change their shape in a manner known per se depending on their own temperature.

FIG. 18 shows the second adjustment position of the adjusting element 13 where the bimetal disks 32 are at hot water temperature.

FIG. 17, in contrast shows the first adjustment position of the adjusting element 13 where the bimetal disks 32 are cooled down to cold water temperature.

In order to create a sufficient adjustment path between the first adjustment position and the second adjustment position, the bimetal disks 32 are stacked one on top of another in order to add up the respective temperature-induced expansions of the individual bimetal disks 32.

In the exemplary embodiment, four bimetal disks 32 are stacked one on top of another and are placed onto a guide journal 33. Other numbers of bimetal disks and/or other shapes of bimetal elements are also usable.

Consequently, the adjusting element 13 is acted upon by the bimetal disks 32 in order to move the adjustment movement for changing position.

In the case of further exemplary embodiments, the drive principle of the drive unit 15 according to FIGS. 17-19 is also combinable with one of the exemplary embodiments according to FIGS. 1 to 10 which do not comprise a flow break-down unit 28.

FIGS. 20 to 22 show a further exemplary embodiment according to the invention of a sanitary installation part where, once again, components and functional units which are identical or similar in a functional and/or structural manner to the exemplary embodiments according to FIGS. 1 to 19 are designated with the same references and are not described again separately. The statements concerning FIGS. 1 to 19 consequently apply in a corresponding manner to FIGS. 20 to 22.

In the case of the exemplary embodiment according to FIGS. 20 to 22, the receiving part 9 of the resistance body 8 and the adjusting element 13 are realized on a common component and are consequently integrally connected.

FIG. 20 shows the adjusting element 13 in the first adjustment position, that is at cold water temperature, in which the receiving part 9 is removed from the resistance body 8 in such a manner that the defined volume flow dependency of the quantity regulating function is comparable to the volume flow dependency 11, but at a higher flow rate level.

The opening cross section 10 consequently always acts, that is below and above the threshold temperature, as a quantity regulator with a typical development such as the volume flow dependency 11 in FIG. 4. This case is shown in FIG. 27: below a threshold temperature (or a threshold temperature range, if a hysteresis behavior is realized) the functional unit 7 defines a volume flow dependency 45; above the threshold temperature the functional unit 7 defines a volume flow dependency 11 which is associated with a lower boundary value for the maximum flow volume.

When hot water is supplied into the flow path 4, the temperature-sensitive medium 18 heats up in the already described manner and guides the adjusting element 13 into the second adjustment position shown in FIG. 21.

Figure 27:
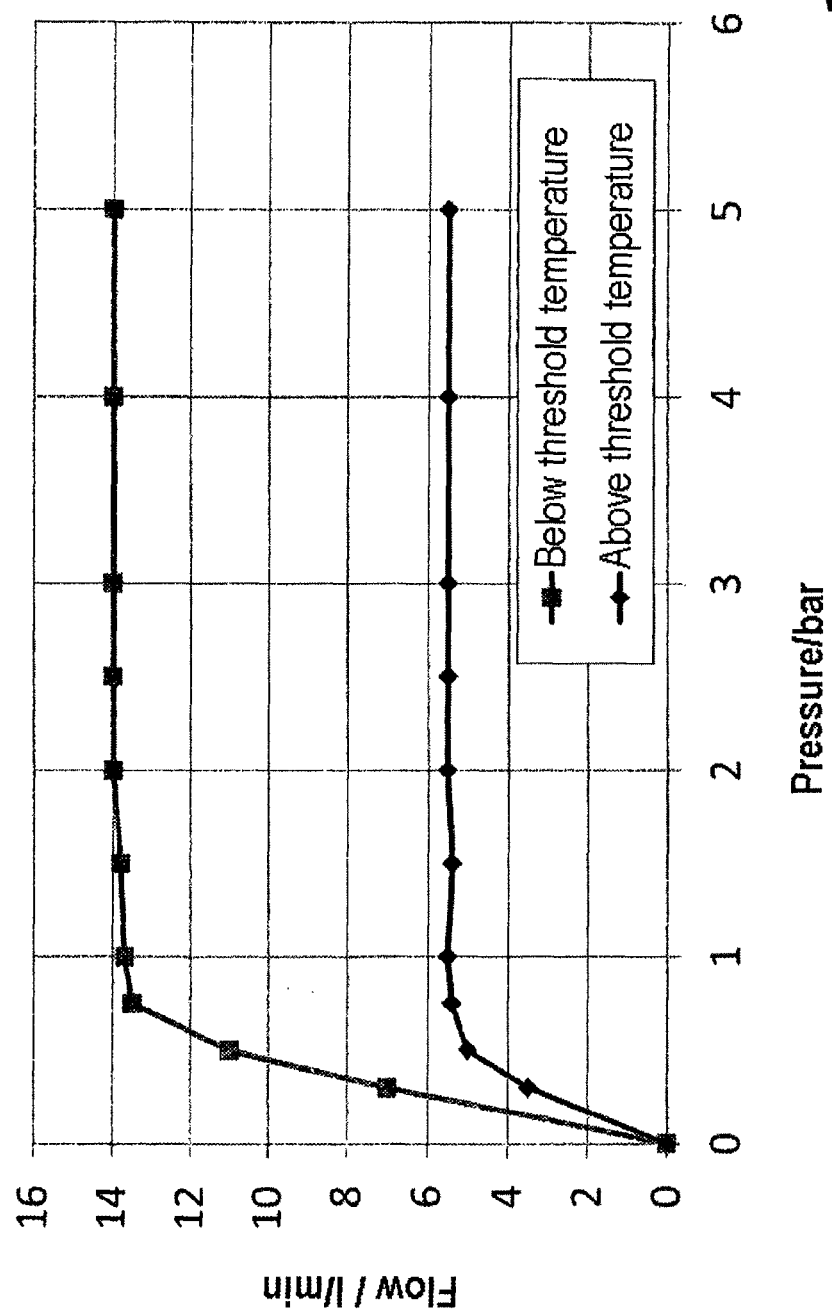
FIG. 27 shows two volume flow dependencies which are realizable with an installation part according to the invention.

In said second adjustment position, the receiving part 9 is moved toward the resistance body 8 in such a manner that the receiving part 9 is active for realizing the volume flow dependency 11 according to FIG. 27.

It must be mentioned again that, in the case of the exemplary embodiments according to FIGS. 11 to 22, the resetting spring 16 is supported on an attachment filter 34 of the installation part 1 which is realized as a flow regulator. In the case of the exemplary embodiments according to FIGS. 1 to 10, the resetting spring 16 is supported, in contrast, on the downstream side on the functional unit 7.

FIGS. 28 to 30 show a further installation part 1 according to the invention. In the case of the exemplary embodiment according to FIGS. 28 to 30, once again components and functional units which are identical or similar in a functional and/or structural manner to the afore-described exemplary embodiments are designated with the same references and are not described again separately. The statements concerning the exemplary embodiments according to FIGS. 1 to 27 consequently apply here in a corresponding manner.

The exemplary embodiment according to FIGS. 28 to 30 differs from the exemplary embodiment according to FIGS. 20 to 22 in that no resistance body 8 is inserted. The functional unit 7 consequently defines both in the first adjustment position (FIG. 28) and in the second adjustment position (FIG. 29) in each case a volume flow dependency 12, 48 of the throttle function type.

This behavior of the functional unit 7 is shown in a qualitative manner in FIG. 31: below a threshold temperature (threshold), that is in the first adjustment position, the functional unit 7 defines a volume flow dependency 12. Above the threshold temperature, that is in the second adjustment position, the functional unit 7 defines a volume flow dependency 48.

The volume flow dependencies 12 and 48 are associated in each case with a throttle, the volume flow dependency 48 describing an increased flow resistance compared to the volume flow dependency 12. Consequently, water consumption above the threshold temperature is also reduced in the case of said exemplary embodiment.

FIGS. 32 to 34 show a further installation part 1 according to the invention. Components which are identical or similar in a functional and/or structural manner to the afore-described exemplary embodiments are designated with the same references and are not described again separately. The statements concerning FIGS. 1 to 31 apply here in a corresponding manner.

The exemplary embodiment according to FIGS. 32 to 34 differs from the exemplary embodiment according to FIGS. 28 to 30 by the development of the flow fractionating unit 28.

Unlike that exemplary embodiment, in the case of the exemplary embodiment according to FIGS. 32 to 34, the nozzles 29 are not aligned axially, but point radially outward. The flowing water is thus directed and sprayed onto a circumferential, inwardly directed deflector plate 49.

Following the spraying on the deflector plate 49, the water passes through further nozzles 50 into the area of influence of the air inlets 30 and is aerated.

Figure 31:
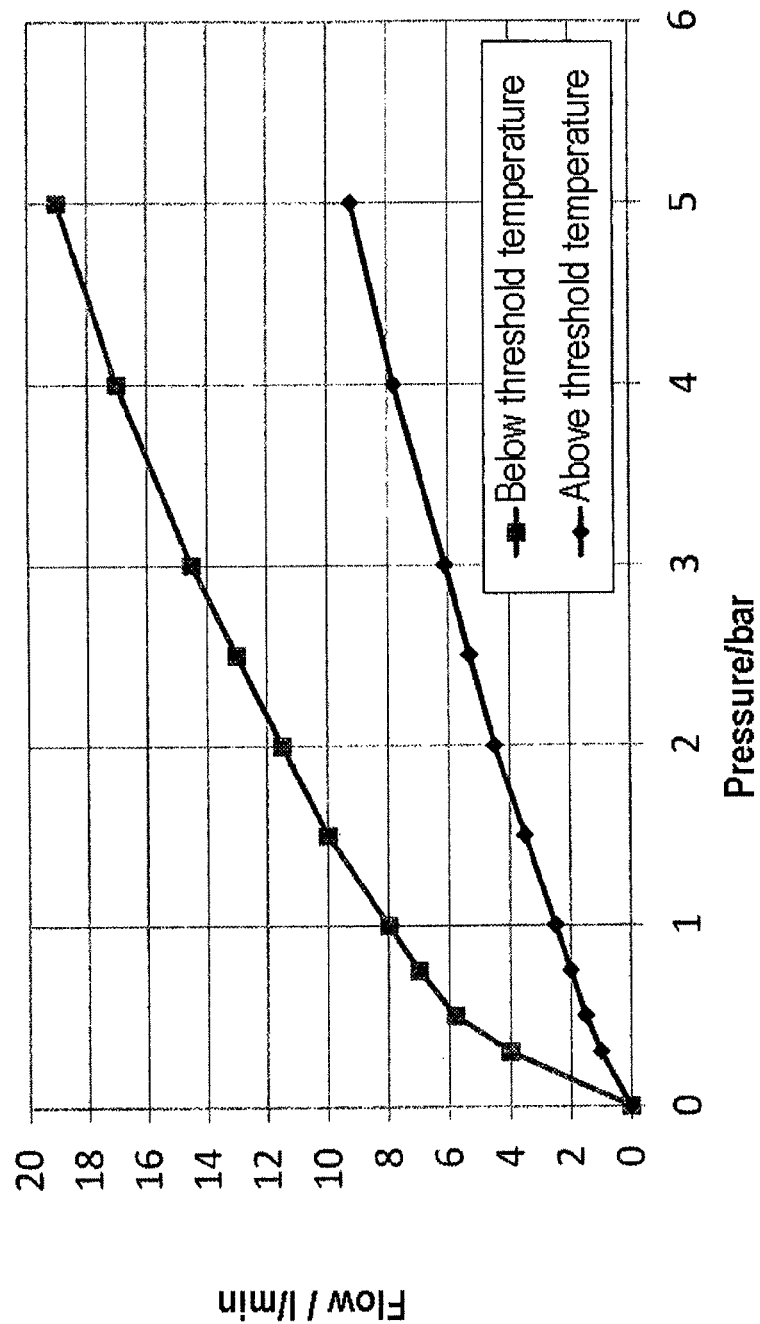
FIG. 31 shows a qualitative schematic diagram of the volume flow dependencies which are realizable with the installation part according to FIG. 28.

The exemplary embodiment according to FIGS. 22 to 34 realizes volume flow dependencies 12, 48 according to FIG. 31.

Figures 35, 36:
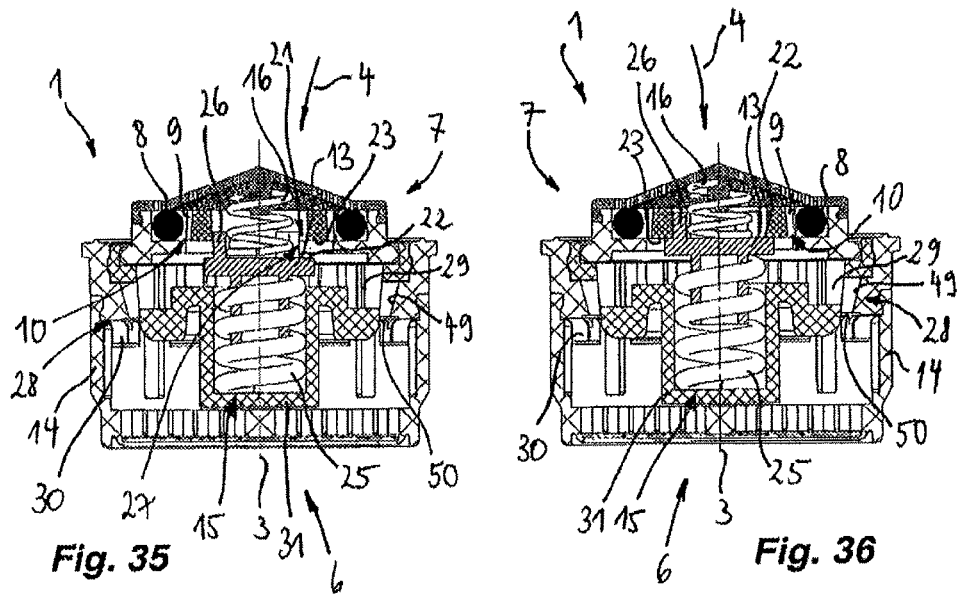
FIG. 35 shows a further installation part according to the invention which is realized as a combined quantity regulator and flow regulator.
FIG. 36 shows the installation part according to FIG. 35 with the adjusting element situated in the second adjusting position and FIG. 37 shows an exploded drawing of the installation part according to FIG. 35.
Figure 37:
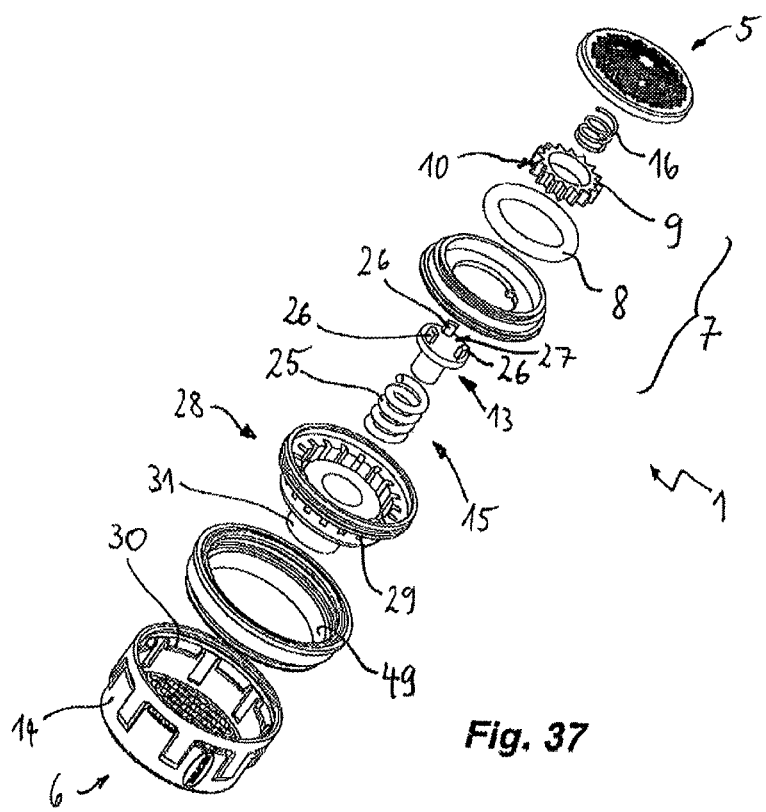

FIGS. 35 to 37 show a further installation part 1 according to the invention. Components which are identical or similar in a functional and/or structural manner to the afore-described exemplary embodiments are designated with the same references and are not described again separately. The statements concerning FIGS. 1 to 34 apply here in a corresponding manner.

The exemplary embodiment according to FIGS. 35 to 37 differs from the exemplary embodiment according to FIGS. 14 to 16 by the development of the flow fractionating unit 28.

The flow fractionating unit 28 is realized here as described for FIGS. 32 to 34. The statements concerning FIGS. 32 to 34 consequently apply in a corresponding manner.

Figure 23:
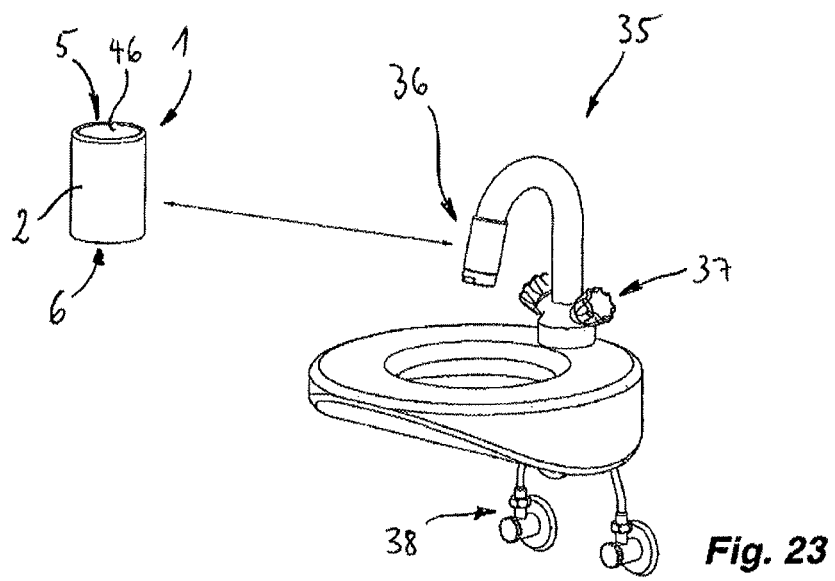
FIG. 23 shows a sanitary fitting according to the invention in the operating position.

FIG. 23 shows a possible use of the sanitary installation part 1 according to the invention in a sanitary fitting which is given the overall reference of 35.

The installation part 1, which can be realized, for example, according to the exemplary embodiments according to FIGS. 1 to 22 or in another manner according to the invention, is arranged in a water outlet 26, that is downstream of the mixer tap 37 in the direction of flow.

Depending on the temperature of the flowing water, adjusted by means of the mixer tap 37, at the water outlet 36, the installation part 1 consequently realizes the volume flow dependency 11 or the volume flow dependency 12 according to FIG. 4 in the described manner.

Consequently, as long as cooled water flows out of a hot water inlet 38, an increased flow volume through the water outlet 36 can be set initially in order to allow said cooled water to flow away as quickly as possible.

As soon as hot water at the desired temperature flows via the hot water inlet 38 to the water outlet 36, the sanitary installation part 1 enables, for example, the defined volume flow dependency 11 according to FIG. 4 in the described manner.

Figure 24:
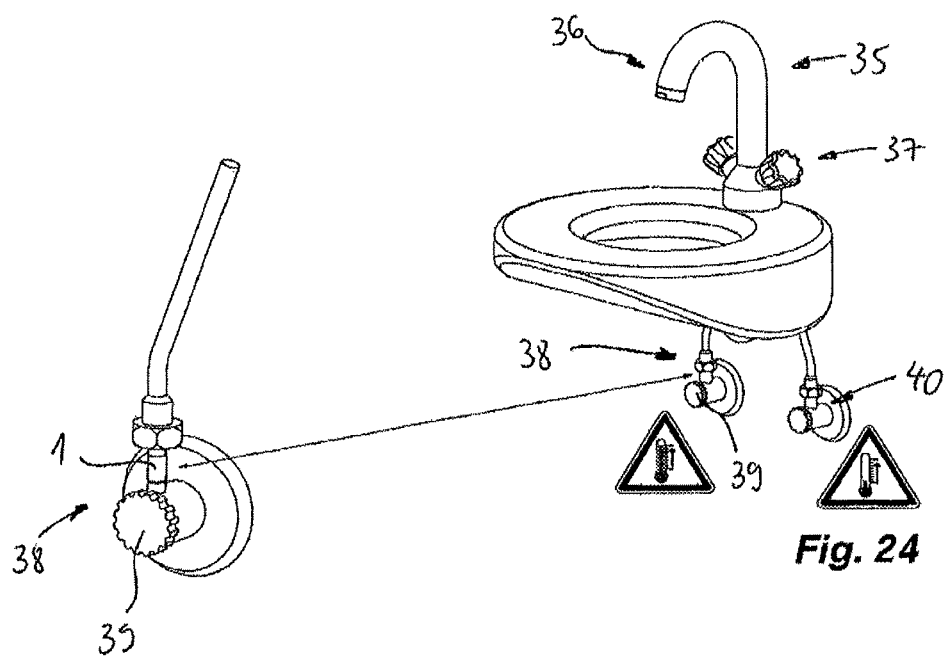
FIG. 24 shows a further use according to the invention of a sanitary installation part according to the invention in the case of a sanitary fitting.

FIG. 24 shows a further exemplary embodiment of a sanitary fitting 35 according to the invention where the sanitary installation part 1 is arranged in the hot water inlet 38, that is upstream of the mixer tap 37 in the direction of flow. This can be achieved, for example, as a result of the sanitary installation part 1 according to the invention being arranged directly on an angle valve 39.

Consequently, water from the cold water inlet 40 can flow to the water outlet 36 uninfluenced by the quantity regulating function of the sanitary installation part.

Apart from this, the statements concerning FIG. 23 apply in a corresponding manner in the case of the exemplary embodiment according to FIG. 24.

It can be seen from FIGS. 23 and 24 that the installation part 1, which is realized as a cartridge, is also able to be fitted in a simple manner in retro to existing sanitary fittings 35, e.g. in connecting parts which are provided with corresponding connecting threads.

In this connection it must be mentioned again that the installation parts 1 shown in the Figures are provided in each case at the inlet 5 and at the outlet 6 with an internal thread 46 and/or an external thread 47 in order to connect the installation part 1.

In a preferred manner, the first temperature lies below a threshold temperature, while the second temperature lies above the threshold temperature.

Figure 26:
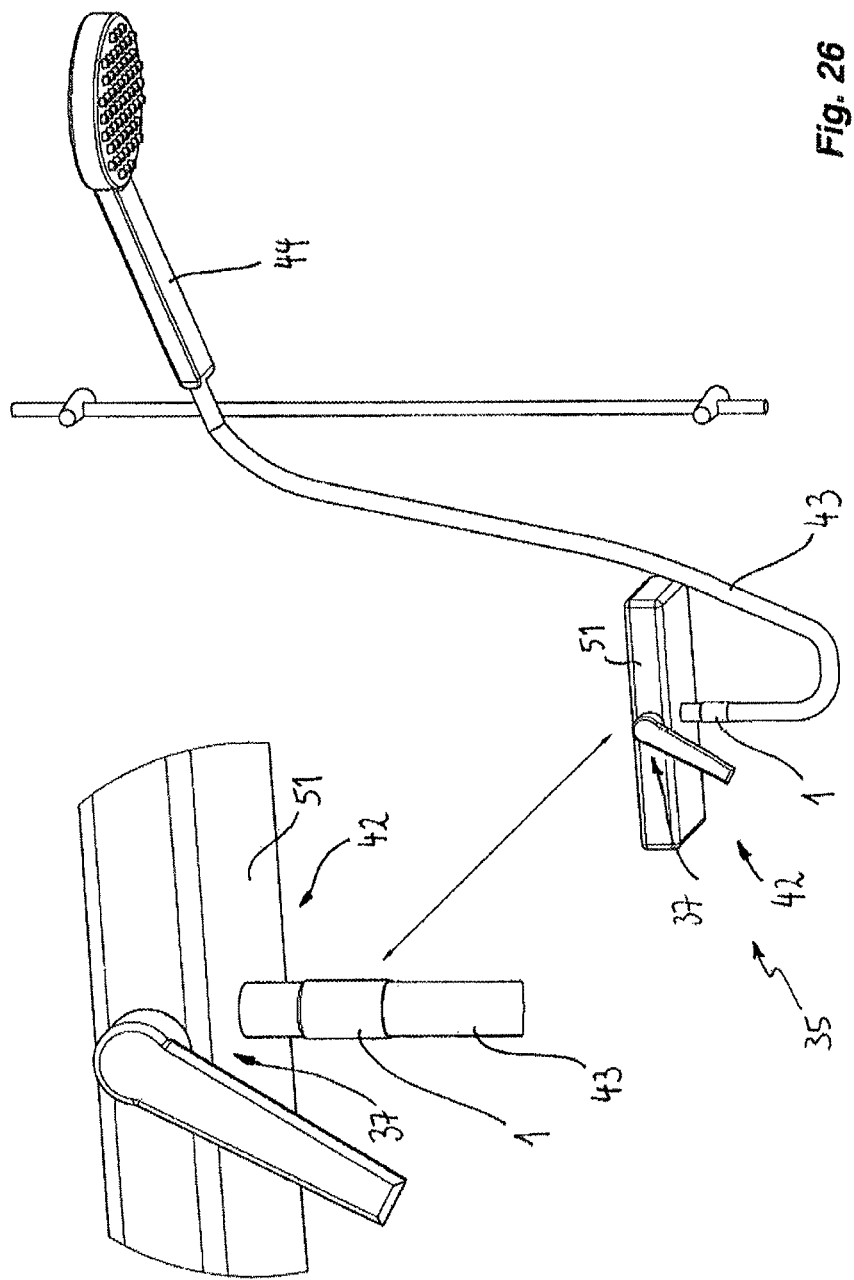
FIG. 26 shows a further use according to the invention of a sanitary installation part according to the invention in the case of a sanitary fitting.

FIG. 26 shows a further exemplary embodiment of a sanitary fitting 35 according to the invention in the form of a shower fitting 42 with a shower hose 43 and a shower head 44 connected thereto. The sanitary installation part 1 is inserted at the start of a shower hose 43, that is downstream of the mixer tap 37 in the direction of flow. In this connection, the installation part 1 is screw-connected by means of an internal thread 46 or an external thread 47 to the shower hose 43 or to a different sanitary hose on the one hand and to the sanitary fitting 35 on the other.

In the case of a further exemplary embodiment, the installation part 1 can also be used for mounting at least in part into the receiving housing 51 of the sanitary fitting 35 and can be screw-connected to said sanitary fitting.

In the case of the sanitary installation part 1, which together with a functional unit 7 forms a quantity regulator, it is proposed to couple an adjusting element 13, which is adjustable along an adjustment path, with a temperature-sensitive drive unit 15 in such a manner that, depending on the temperature of the medium traversing the installation part 1, different adjustment positions of the adjusting element 13 are set, the different adjustment positions realizing in each case volume flow dependencies 11, 12, 45, 48 and/or flow resistances that are different from one another.

LIST OF REFERENCES

1 Sanitary installation part
2 Installation sleeve
3 Axis
4 Flow path
5 Inlet
6 Outlet
7 Functional unit
8 Resistance body
9 Receiving part
10 Opening cross section
11 Volume flow dependency
12 Volume flow dependency
13 Adjusting element
14 Housing
15 Drive unit
16 Resetting spring
17 Receiving chamber
18 Temperature-sensitive medium
19 Movable chamber wall
20 Piston
21 Flow opening
22 Contact surface
23 Counter contact surface
25 Drive element
26 Guide element
27 Opening
28 Flow fractionating unit
29 Nozzle
30 Air inlet
31 Frame
32 Bimetal disk
33 Guide journal
34 Attachment filter
35 Sanitary fitting
36 Water outlet
37 Mixer tap
38 Hot water inlet
39 Angle valve
40 Cold water inlet
41 Web
42 Shower fitting
43 Shower hose
44 Shower head
45 Volume flow dependency
46 Internal thread
47 External thread
48 Volume flow dependency
49 Deflection plate
50 Further nozzle
51 Receiving housing

The invention claimed is:

1. A sanitary installation part (1), comprising a functional unit (7) arranged in a flow path (4) of the sanitary installation part (1) that defines a volume flow in dependence on a pressure as a volume flow dependency (11, 12, 45, 48), the functional unit (7) comprises a flow resistance element in the flow path (4) that is adapted to be pressed in a variously strong manner against a receiving part (9) such that a pressure-dependent cross-sectional area of the flow path decreases as the pressure rises, and a movably arranged adjusting element (13) which is longitudinally displaceable along an adjustment path at least between a first adjustment position and a second adjustment position, and the defined volume flow dependency (11, 12, 45, 48) is modifiable by a change in a position of the adjusting element (13) along the adjustment path, and a temperature-sensitive drive unit (15) acts upon the adjusting element (13) to longitudinally displace the adjusting element (13) along the adjustment path as a result of a change in temperature at the drive unit (15).

2. The sanitary installation part (1) as claimed in claim 1, wherein the temperature-sensitive drive unit (15) comprises at least one of a temperature-dependent expansion arrangement in at least one dimension or a resetting spring (16) which resets the adjusting element (13) when the drive unit (15) cools down to or below a first temperature.

3. The sanitary installation part (1) as claimed in claim 1, wherein the temperature-sensitive drive unit (15) comprises a receiving chamber (17) which is filled with a temperature-sensitive medium (18), and at least one movable chamber wall (19) of the drive unit is operatively connected to the adjusting element (13) and acts upon the adjusting element (13).

4. The sanitary installation part (1) as claimed in claim 1, wherein the drive unit (15) comprises a drive element (25) produced from a material with shape memory or the drive unit (15) comprises at least one bimetal element.

5. The sanitary installation part (1) as claimed in claim 1, wherein with the adjusting element (13) in the first adjustment position a flow opening (21) is exposed or opened in the flow path (4).

6. The sanitary installation part (1) as claimed in claim 1, wherein the adjustment path is set up in an impact-free manner at least at a path end that is closer to the second adjustment position.

7. The sanitary installation part (1) as claimed in claim 1, wherein the adjusting element (13) comprises a contact surface (22) which interacts with a counter contact surface (23) for closing a flow opening (21).

8. The sanitary installation part (1) as claimed in claim 7, wherein at least one of: the contact surface (22) is aligned on the adjusting element (13) longitudinally or tangentially with respect to the adjustment path or the adjusting element (13) engages with a guide element (26) in the flow opening (21) at least in the first adjustment position.

9. The sanitary installation part (1) as claimed in claim 7, wherein the contact surface (22) is aligned coaxially with respect to the counter contact surface (23).

10. The sanitary installation part (1) as claimed in claim 1, wherein the functional unit (3) defines a traversed opening cross section (10), a cross sectional area of which reduces over the functional unit (7) as a pressure gradient increases.

11. The sanitary installation part (1) as claimed in claim 1, wherein the drive unit (15) is at least one of arranged in the flow path (4) so as to be flowed around or upstream or downstream of the functional unit (7) in a flow direction of the flow path (4).

12. The sanitary installation part (1) as claimed in claim 1, wherein the volume flow dependency (11, 12, 45, 48) describes at least one of a throttle function below a threshold temperature or a quantity restricting function above the or a threshold temperature.

13. The sanitary installation part (1) as claimed in claim 1, wherein the installation part (1) as a flow regulator or the sanitary installation part is provided with a thread (46, 47) and is insertable into a receiving housing.

14. A method for controlling a flow volume of flowing water by a sanitary installation part, comprising: providing the sanitary installation part (1) having a volume flow dependency (11, 12, 45, 48), which defines an adjustable volume flow in dependence on a pressure by increasing a pressure-dependent cross-sectional area of a flow resistance element in the flow path (4) as the pressure rises to form an opening cross-section with a pressure-dependent cross-sectional area, and adjusting the volume flow dependency in dependence on a temperature of the flowing medium by allowing a first flow volume in the case of at least one pressure of the flowing medium at a first temperature and allowing a second flow volume which is smaller than the first flow volume at a second temperature which is higher than the first temperature at said at least one pressure of the flowing medium.

15. The method as claimed in claim 14, wherein at or above the second temperature the volume flow dependency (11, 12, 45, 48) defines at least one of an increased flow resistance of a flow path (4) or a limiting of the flow volume.

16. The method as claimed in claim 14, wherein below a threshold temperature of the flowing medium, the volume flow dependency (11, 12, 45, 48) of a throttle function is set or above the or a threshold temperature of the flowing medium, a volume flow dependency (11, 12, 45, 48) of a quantity limiting function is adjusted.

17. The sanitary installation part as claimed in claim 1, wherein with the adjusting element (13) in the second adjustment position a flow opening (21) is closed in the flow path (4).

18. The sanitary installation part as claimed in claim 1, wherein the adjustment path extends between the first adjustment position and an adjustment end position, wherein the second adjustment position is arranged between the first adjustment position and the adjustment end position.

19. The sanitary installation part as claim in claim 1, wherein the adjusting element (13) comprises a contact surface (22) that is movable past a counter contact surface (23) of a housing (14) or frame (31) as a result of a change in a position of the adjusting element (13) along the adjustment path.

* * * * *